(12) United States Patent
Jahagirdar et al.

(10) Patent No.: US 11,531,833 B2
(45) Date of Patent: Dec. 20, 2022

(54) CREATING A GROUND CONTROL POINT FILE USING AN EXISTING LANDMARK SHOWN IN IMAGES

(71) Applicant: Honeywell International Inc., Morris Plains, NJ (US)

(72) Inventors: Manik Mahesh Jahagirdar, Edina, MN (US); Thandava Krishna Edara, Plymouth, MN (US); Pedro Davalos, Plymouth, MN (US); Arjun Bindu Jyothikumar, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 357 days.

(21) Appl. No.: 16/744,308

(22) Filed: Jan. 16, 2020

(65) Prior Publication Data

US 2021/0224589 A1    Jul. 22, 2021

(51) Int. Cl.
*G06K 9/62* (2022.01)
*G06F 16/9035* (2019.01)
(Continued)

(52) U.S. Cl.
CPC .......... *G06K 9/6255* (2013.01); *B64C 39/024* (2013.01); *G06F 16/9035* (2019.01);
(Continued)

(58) Field of Classification Search
CPC ................ G06K 9/6255; B64C 39/024; B64C 2201/127; G06F 16/9035; G06F 16/29;
(Continued)

(56) References Cited

U.S. PATENT DOCUMENTS 9,721,158 B2   8/2017  Wang et al.
10,250,821 B2  4/2019  Pulleti et al.
(Continued)

FOREIGN PATENT DOCUMENTS

CN   107341851 A   11/2017
CN   108981706 A   12/2018
(Continued)

OTHER PUBLICATIONS

Notice of Intent to Grant and Text Intended to Grant from counterpart European Application No. 21150605.0 dated Jan. 11, 2022, 49 pp.
(Continued)

*Primary Examiner* — Jerome Grant, II
(74) *Attorney, Agent, or Firm* — Shumaker & Sieffert, P.A.

(57) ABSTRACT

In some examples, a system includes a memory configured to store a first image and a second image captured by one or more cameras mounted on one or more vehicles and store locations and orientations of the one or more cameras at times when the first and second images were captured. The system also includes processing circuitry configured to identify an existing landmark in the first and second images. The processing circuitry is also configured to determine a latitude, a longitude, and an altitude of the existing landmark based on the locations and orientations of the one or more cameras at the times when the images were captured. The processing circuitry is configured to create a file including the location of the existing landmark and pixel coordinates of the existing landmark in the first and second images.

20 Claims, 10 Drawing Sheets

(51) Int. Cl.
  *B64C 39/02* (2006.01)
  *G06V 10/24* (2022.01)
  *G06V 20/13* (2022.01)
(52) U.S. Cl.
  CPC ............ *G06V 10/242* (2022.01); *G06V 20/13* (2022.01); *B64C 2201/127* (2013.01)
(58) Field of Classification Search
  CPC ...... G06V 10/242; G06V 20/13; G06V 10/62; G06V 10/245; G01C 21/20; G01C 11/00; G01S 17/933; G01S 17/86; G01S 17/89; G06T 7/73; G06T 2207/10028
  USPC ........................................................ 382/209
  See application file for complete search history.

(56) References Cited

U.S. PATENT DOCUMENTS

| | | | |
|---|---|---|---|
| 10,937,232 | B2 | 3/2021 | Huang |
| 11,113,567 | B1* | 9/2021 | Durand ................ G06N 20/00 |
| 2017/0237892 | A1* | 8/2017 | Sakai ........................ G06T 7/70 348/207.11 |
| 2018/0204469 | A1 | 7/2018 | Moster et al. |
| 2018/0259341 | A1* | 9/2018 | Aboutalib ............. B64C 39/024 |
| 2018/0372493 | A1 | 12/2018 | Pilkington et al. |
| 2019/0089861 | A1 | 3/2019 | De Mers et al. |
| 2019/0097827 | A1* | 3/2019 | Angle .................... G05D 1/0044 |
| 2019/0236797 | A1* | 8/2019 | Thyagharajan ......... G06T 7/593 |
| 2019/0346842 | A1 | 11/2019 | Bye et al. |
| 2021/0027487 | A1* | 1/2021 | Lawlor .................... G06T 7/74 |
| 2022/0042823 | A1* | 2/2022 | Lee .................... G01C 21/3815 |

FOREIGN PATENT DOCUMENTS

| | | | | |
|---|---|---|---|---|
| EP | 3208774 | * | 8/2017 | ............. G06T 19/00 |
| EP | 3851793 | * | 7/2021 | ........... G06V 10/242 |
| KR | 101571886 | * | 11/2015 | ............. G01C 13/00 |
| KR | 101859947 | B1 | 6/2018 | |
| WO | WO03041411 | * | 5/2003 | ............... H04N 7/18 |
| WO | 2019144317 | A1 | 8/2019 | |

OTHER PUBLICATIONS

Extended Search Report from counterpart European Application No. 21150605.0, dated Jun. 11, 2021, 11 pp.

Response to Extended Search Report dated Jun. 11, 2021, from counterpart European Application No. 21150605.0, filed Jun. 23, 2021, 74 pp.

U.S. Appl. No. 16/365,214, by Honeywell International Inc. (Inventors: Edara et al.), filed Mar. 26, 2019.

U.S. Appl. No. 16/169,879, by Honeywell International Inc. (Inventors: Jahagirdar), filed Oct. 24, 2018.

* cited by examiner

CREATING A GROUND CONTROL POINT FILE USING AN EXISTING LANDMARK SHOWN IN IMAGES

TECHNICAL FIELD

This disclosure relates to the image processing.

BACKGROUND

Large-scale three-dimensional point cloud creation from photogrammetry can be a very complicated process. To ensure a better accuracy, photogrammetry software often relies on precisely located and manually placed spatial markers, also known as ground control points.

SUMMARY

In general, this disclosure relates to systems, devices, and techniques for creating a ground control point (GCP) file based on images captured by camera(s) mounted on vehicle(s). To create the GCP file, a computing system can identify an existing landmark in the images. The computing system can determine the latitude, longitude, and altitude of the existing landmark based on the location and orientation of the camera(s) when the images were captured, or in the alternative, the computing system may be configured to associated with the existing landmark with an entry in a pre-existing database of existing landmarks. The computing system may be configured to then create the GCP file based on the images and further based on the location associated with the existing landmark.

In some examples, a system can create a GCP file based on images captured by one or more cameras mounted on one or more vehicles. The system includes a memory configured to store a first image and a second image captured by the one or more cameras. The memory is also configured to store locations and orientations of the one or more cameras at times when the first and second images were captured. The system also includes processing circuitry configured to identify an existing landmark in the first image and identify the existing landmark in the second image. The processing circuitry is further configured to determine a latitude, a longitude, and an altitude of the existing landmark shown in the first and second images based on the locations and the orientations of the one or more cameras at the times when the first and second images were captured. The processing circuitry is also configured to create the GCP file including the latitude, longitude, and altitude of the existing landmark and pixel coordinates of the existing landmark in the first and second images.

In some examples, a method includes creating a GCP file based on images captured by one or more cameras mounted on one or more vehicles. The method also includes receiving, at processing circuitry, a first image and a second image from the one or more cameras and determining, by the processing circuitry, locations and orientations of the one or more cameras at times when the first and second images were captured. The method further includes identifying, by the processing circuitry, an existing landmark in the first image based on an existing landmark shown in the first image and identifying the existing landmark in the second image based on the existing landmark shown in the second image. The method includes determining, by the processing circuitry, a latitude, a longitude, and an altitude of the existing landmark shown in the first and second images based on the locations and the orientations of the one or more cameras at the times when the first and second images were captured. The method further includes creating, by the processing circuitry, the GCP file including the latitude, longitude, and altitude of the existing landmark and pixel coordinates of the existing landmark in the first and second images.

In some examples, a system can create a GCP file based on images captured by one or more cameras mounted on one or more vehicles. The system includes a memory configured to store a first image and a second image captured by the one or more cameras. The memory is also configured to store a pre-existing database of the locations of existing landmarks. The system also includes processing circuitry configured to identify an existing landmark in the first image based on an existing landmark shown in the first image and identify the existing landmark in the second image based on the existing landmark shown in the second image. The processing circuitry is further configured to determine that the first existing landmark matches an entry in the pre-existing database. The processing circuitry is also configured to create the GCP file including a latitude, a longitude, and an altitude associated with the entry in the pre-existing database and pixel coordinates of the existing landmark in the first and second images.

The details of one or more examples of the disclosure are set forth in the accompanying drawings and the description below. Other features, objects, and advantages will be apparent from the description, drawings, and claims.

DETAILED DESCRIPTION

Figure 1:
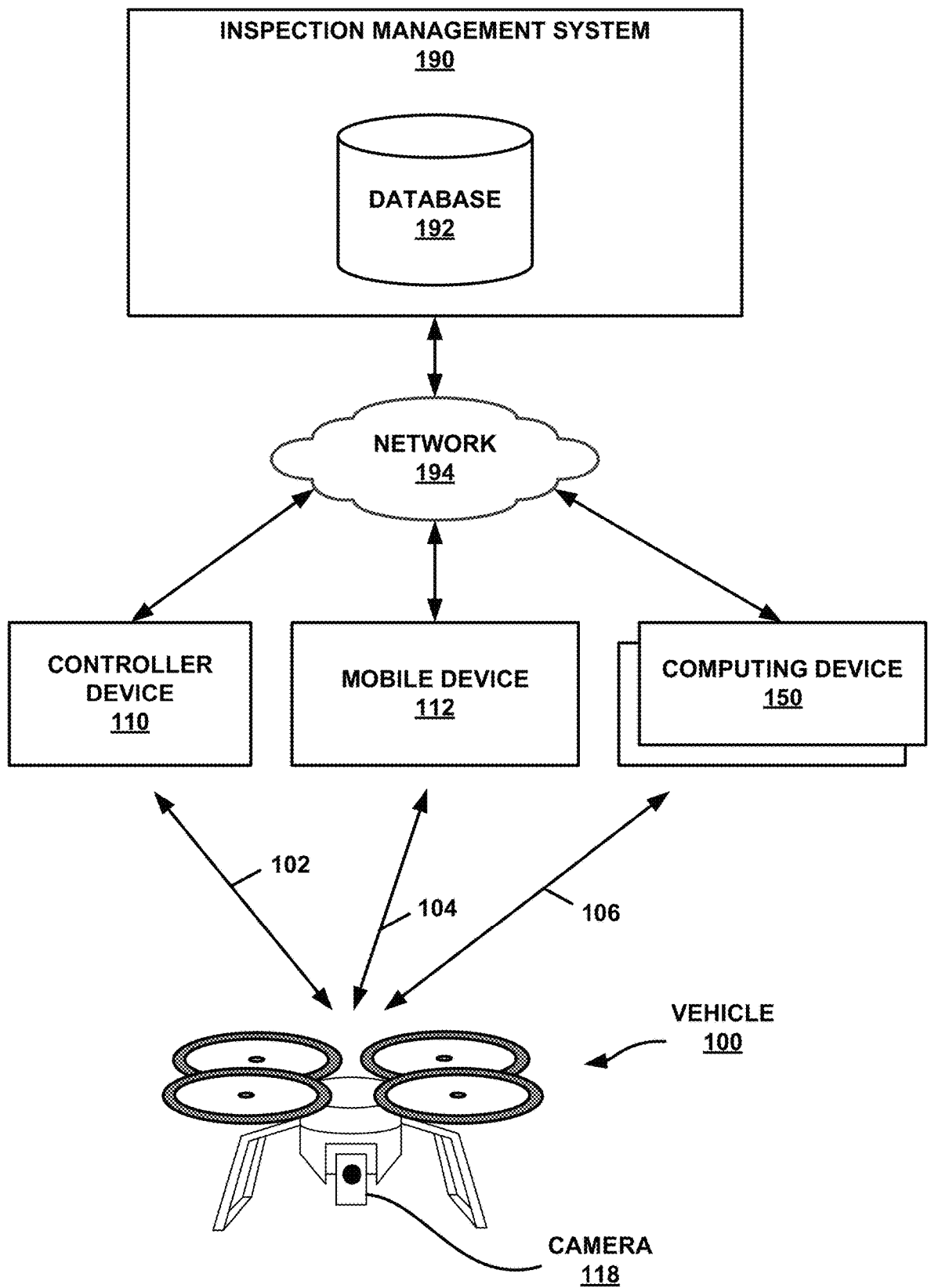
FIG. 1 shows an example vehicle system, which may be configured to implement the techniques of this disclosure.

This disclosure describes techniques for creating a ground control point (GCP) file using existing landmarks shown in images. A computing system can determine the locations of one or more existing landmarks shown in images based on the locations and orientations of the camera(s) at the time that the images were captured. The computing system may automatically perform the process of cross-referencing a landmark shown in images with a determined location for the landmark without any user input. Although the system may first check for the predefined symbols associated with manually placed markers when creating a GCP file, the techniques of this disclosure may be especially useful when creating a GCP file in the absence of manually placed markers with precisely surveyed locations. In examples in which manually placed markers or a pre-existing database of existing landmarks are not available, the computing system may be configured to create a GCP file based on an existing landmark shown in the images.

In contrast, another computing system may rely solely on the predefined symbols associated with spatial markers that are manually placed, surveyed, and recorded by a worker. The manual placement of spatial markers may involve a worker placing the spatial markers before an inspection or a data-gathering mission. The worker can attach a spatial marker to an object and record the location of the spatial marker after placement. The spatial marker may be a sticker or a marking with an easily identifiable, predefined symbol such as an X, a bar code, or a cross. In some examples, a computing system can use the takeoff pad for the vehicle (e.g., a helipad for an aerial vehicle) as a ground control point. For example, a UAV may have a mobile helipad used for launching the UAV, and the UAV operator can record the location of the helipad using Global Navigation Satellite System (GNSS). The manual placement of ground control point indicators may involve regular maintenance to ensure that the spatial marker remains in the desired location. Placing such indicators and recording the locations of the indicators in a large inspection area can be time consuming and expensive. Where such manually placed markers are available, a system of this disclosure may be configured to identify a predefined symbol associated with a manually placed marker and use the recorded locations of the manually placed markers to create a GCP file. However, the system of this disclosure can also create a GCP file in the absence of such manually placed markers. Thus, the system may first determine whether the predefined symbols of manually placed spatial markers are shown in the images before checking for existing landmarks in the images.

A computing system of this disclosure can use a vehicle such as an unmanned aerial vehicle (UAV) platform with data analytics tools to automatically create a file or a database entry for a ground control point by automatically identifying and geo-locating various assets and cross-referencing the locations of the assets with available databases. The file or entry may include the estimated location of the existing landmark (e.g., latitude, longitude, and altitude), the position of the existing landmark in each image (e.g., horizontal and vertical coordinates), the name of the existing landmark, and/or the filename of each image. The computing system can estimate the location of the existing landmark using a triangulation process based on the locations and orientations of the cameras at the times that the images were captured. The file or entry can also include the type, material, shape, size, height or other dimensions, and/or color of the landmark (e.g., a distinctive shape or color of the landmark). For example, the type of the landmark can include an indication of the type of pole (e.g., hedge post, T-post, wooden post, metal post).

A database containing the location of existing landmarks may be a pre-existing database or a database created using the images in which the existing landmarks are shown. An example of a pre-existing database is a database created and managed by a utility company or a department of transportation. The database may include the pre-measured locations of landmarks in a construction site, a highway bridge, a power plant, a power transmission corridor, and/or any other location that is surveyed to determine the location of landmarks. Additionally or alternatively, the computing system can create the database using the images showing the landmarks. The computing system can determine the locations of each landmark based on the location and orientation of a camera at the time when each image was captured.

A computing system using the techniques of this disclosure can automatically generate a ground control point database using images captured one or more vehicles as an inspection platform without using any additional manually placed spatial markers. The features described herein may be part of the inspection services offered to utility companies, construction companies, transportation departments, and any other companies. This system can increase the accuracy in the creation of a GCP file. Moreover, using this system, the inspection crew does not have to manually place any special ground control point markers throughout the inspection area.

FIG. 1 shows an example system for performing an inspection or creating a GCP file, which may be configured to implement the techniques of this disclosure. In the example of FIG. 1, the system includes vehicle 100, a controller device 110, a mobile device 112, an inspection management system 190, one or more computing devices 150, and a network 194. Although vehicle 100 is depicted as a UAV, the techniques can also be used by any manned vehicle, unmanned vehicle, land vehicle, aerial vehicle, water-based vehicle, and/or any other vehicle. The techniques of this disclosure can be performed by more than one vehicle capturing images, including dissimilar vehicles such as manned and unmanned vehicles, land and aerial vehicles, and/or any other combination of vehicle types.

A vehicle operator may use controller device 110 to control a travel path or flight path of vehicle 100. An inspector may use mobile device 112 to control sensors, such as cameras, mounted on vehicle 100 to perform an aerial inspection of an inspection target, such as an electrical transmission line, an electrical distribution facility, a power generation facility, a bridge, a building, and/or any other type of inspection site. Inspection management system 190 provides resources to support an end-to-end workflow for vehicle-based inspections. Users may use computing devices 150 to interact with devices 110 and 112 and inspection management system 190. Network 194 facilitates communication among controller device 110, mobile device 112, inspection management system 190, and computing devices 150. Devices 110, 112, and 150 may directly communicate with each other, or devices 110, 112, and 150 may communicate through intermediate devices, such as gateways, routers, switches, repeaters, or other such network devices.

Although shown as separate devices in FIG. 1, in other examples, the functionality of controller device 110 and mobile device 112 may be performed by a single device or by multiple devices. Likewise, the techniques of this disclosure, including identifying landmarks, characterizing the landmarks as ground control points, determining locations, creating a GCP file, and constructing a model, can be performed by one processor or also multiple processors, either within a single computing device or across multiple computing devices. Furthermore, in other examples, vehicle 100 is sufficiently autonomous to avoid the need to have a pilot use a controller device, such as controller device 110, to navigate vehicle 100 along a flight path. In some examples, devices 110, 112, and/or 150 each comprises a general-purpose device such as a laptop or desktop computer, a tablet computer, a cellular or satellite radio telephone, a smart phone, or another such device. Any or all of devices 110, 112, and/or 150 may comprise a special-purpose device designed specifically for use in controlling vehicle 100, receiving data signals from vehicle 100 via communication links 102, 104, and 106, exchanging data signals with other devices, presenting images via a display, and/or receiving user inputs. Any or all of devices 110, 112, and/or 150 may include a handheld device and/or be a part of a ground control base station.

Devices 110, 112, and 150 communicate with vehicle 100 via communication links 102, 104, and 106, respectively. In some examples, vehicle 100 is configured to stream data to mobile device 112 in real-time or near real time via, for example, a wireless communication link 106. Mobile device 112 may also provide commands to vehicle 100 via communication link 106. Communication link 108 may be implemented in a manner similar to communication link 102. Communication links 102, 104, and 106 may allow transmission of data signals and control signals. For example, a user of one of devices 110, 112, and 150 can create annotations via user inputs, and the respective device may communicate the annotations to the other of devices 110, 112, and 150.

Inspection management system 190 comprises one or more computing devices. For example, inspection management system 190 may comprise one or more computing devices, such as a laptop or desktop computer, a tablet computer, a server device, or another such device. Inspection management system 190 may be loaded with and configured to execute software designed to provide resources to support an end-to-end workflow for UAV-based aerial inspections. In some examples, controller device 110 communicates with inspection management system 190 to obtain and send data, such as flight plan data. Devices 110, 112, and 150 may communicate with inspection management system 190 to retrieve and store data.

One or more cameras 118 are mounted on vehicle 100. Cameras 118 may include one or more cameras capable of capturing images of visible light. In some examples, cameras 118 may include one or more cameras capable of capturing images of infrared radiation, or other types of cameras or sensors. Additionally or alternatively, one or more cameras 118 may be configured to capture video, where the video frames can be used by system 190 to identify landmarks, characterize the landmarks as ground control points, and create a GCP file in the same manner as images. The system may use video frames to determine the location of landmarks to create the GCP file in the same manner as images described herein. For example, system 190 may be configured to use two frames from a video captured by cameras 118 as two separate images for identifying a landmark, characterizing the landmark as a ground control point, and creating a GCP file. Vehicle 100 may perform aerial inspections of various types of inspection targets. For example, an inspection target or inspection site may be a building, a dam, a solar panel array, a wind turbine, a monument, a bridge, a levee, a seawall, a pier, an antenna, a volcano, a pump station, an agricultural area, an electrical transmission tower, or another type of artificial or natural structure. The images used to create a GCP file can be captured by one or more cameras on a single vehicle or one or more cameras distributed across multiple vehicles.

In some examples, vehicle 100 saves the captured images on a Secure Digital (SD) card or other type of memory card, and additionally or alternatively may also transfer on-line to a cloud-based web server using 3G, 4G, 5G, Narrow Band-Internet of Things (NBIOT), or another wireless type of transmission technologies. In some examples, vehicle 100 is equipped with one or more differential GNSS devices to assist vehicle 100 navigate to the image capture locations. For instance, vehicle 100 may be equipped for real-time kinematics, which is a type of differential GNSS that may provide high positioning performance for vehicle 100 in the vicinity of a base station.

In the example of FIG. 1, inspection management system 190 includes a database 192. Database 192 may store information related to inspection projects. Database 192 may be implemented in various ways. For example, database 192 may comprise one or more relational databases, object-oriented databases, comma-separated value (CSV) files, or other types of databases.

Database 192 may include the images captured by cameras 118, along with the locations and orientations of cameras 118 when the images were captured. The images stored in database 192 can be images captured at different times, during different inspections, and/or stereoscopic images captured in succession. Database 192 may also include the latitude, longitude, and altitude of one or more ground control points. Database 192 may include an optional pre-existing database of existing landmarks in the inspection area. For example, database 192 may include an entry for each existing landmark in the inspection area, where each entry includes a latitude, longitude, and altitude of the respective existing landmark. Database 192 may have been created and/or populated during a previous inspection, during a construction process, or during a land survey. For example, a surveyor can record and enter the location of each existing landmark into database 192 during a survey of a construction site, a power distribution facility, a refinery, a chemical plant, a manufacturing facility, or any other area for which an inspection is being performed or a three-dimensional model is being created.

Additionally or alternatively, database 192 can be populated using data from a range sensor (e.g., lidar) mounted on vehicle 100. The range-sensor data can be collected during a data gathering mission operated by vehicle 100 to acquire position data for the existing landmarks. Inspection management system 190 may be configured to use the GNSS data and range-sensor data from vehicle 100 to determine the location of an existing landmark, which can be used for creating a GCP file. However, inspection management system 190 may be configured to create a GCP file without a pre-existing database of existing landmarks because system 190 can determine the location of an existing landmark that is shown in at least two images.

Inspection management system 190 can create a GCP file based on images captured by vehicle 100 using image processing techniques. The images used by inspection management system 190 may have a threshold amount of overlap, where the overlapping portions may depict an existing landmark. A threshold amount of overlap can mean that the pattern of the landmark is shown in both of the images. Additionally or alternatively, a threshold amount of overlap can mean that less than all of the pattern, but an identifiable portion of the pattern, is shown in both of the images. The threshold amount of overlap may also refer to the percentage of overlapping area in the images, where the threshold amount may be thirty, fifty, seventy, or eighty percent. Inspection management system 190 can determine the location and orientation of vehicle 100 at the times when vehicle 100 captured each image using, for example, GNSS data and inertial navigation system (INS) data received from vehicle 100. Inspection management system 190 can use the images and the determined location and orientation of vehicle 100 for each image to create a GCP file.

The three-dimensional model constructed by inspection management system 190 based on the images captured by vehicle 100 may not have an accurate scaling or any scaling at all. For example, the images captured by vehicle 100 may have good angular resolution, but the range resolution of the images may be less accurate or nonexistent. Moreover, a three-dimensional model constructed by inspection management system 190 without a GCP file may not be referenced to any absolute location. Therefore, inspection management system 190 may use a GCP file to provide an absolute reference for a three-dimensional model and/or to determine a scaling. An inspector can manually place spatial markers (e.g., stickers with predefined symbols) throughout the inspection site so that the predefined symbols associated with the spatial markers will be visible in the captured images. The inspector can also record the locations of each spatial marker using a GNSS device. Although manually placed spatial markers can provide good accuracy for the scaling of a three-dimensional model, the manual placement and recording of the location involves time and expense, especially for a large inspection site.

In accordance with the techniques of this disclosure, inspection management system 190 can use existing landmarks in the captured images to create a GCP file. Inspection management system 190 may be configured to identify one or more landmarks in each image. Inspection management system 190 can query the location (latitude, longitude, and altitude) of each landmark in database 192 to associate the control point with the respective location. Using the known locations of each control point, inspection management system 190 may be able to create a GCP file.

Using existing landmarks instead of manually placed spatial markers can save time and expense for an inspection and modeling process that includes the creation of a GCP file. By automating the process, the inspector may not have to manually place or record the locations of the spatial markers. In addition, the inspector does not have to enter the location of each manually placed spatial marker or remove the spatial markers after the inspection is complete. The use of existing landmarks can also reduce the likelihood of inaccuracies introduced by human error in placing the spatial markers or recording the location of spatial markers. Examples of existing landmarks include poles (e.g., power transmission poles), a power transmission tower, a communication tower, a wind turbine, a solar panel, a traffic sign, a chimney, or a portion of a building.

An inspection site may include existing landmarks such as poles, buildings, signs, electrical power transmission and distribution structures, and many other types of landmarks. The existing landmarks may include static objects, such as poles and buildings, and movable objects, such as vehicles. In some examples, inspection management system 190 may be configured to use static landmarks as ground control points because movable objects may have different locations in images taken at different times. Database 192 may already store the known locations of these landmarks because, for example, the locations may have been recorded during a survey performed during a construction process. Thus, inspection management system 190 can leverage this data to automatically create a GCP file that can be used, for example, to determine a scaling for a three-dimensional model of the inspection site. The use of vehicle 100 (e.g., a UAV) can make the process of creating a GCP file, along with the inspection and model generation process much more efficient. Even without a pre-existing database of landmarks, inspection management system 190 may be configured to determine the location of landmarks shown in images based on the locations and orientations of cameras 118 when the images were captured. For example, inspection management system 190 can use triangulation or another technique to estimate the latitude, longitude, and altitude of a ground control point. In examples in which the predefined symbols associated with manually placed markers are shown in the images, inspection management system 190 may be configured to create a GCP file based on the known locations of the manually placed markers.

The term "ground control point" used herein does not exclude control points that are not located on the ground surface. For example, inspection management system 190 may be configured to identify a point on an electrical transmission tower or a cellular communication tower that is tens or hundreds of meters above the ground surface and characterize that point as a ground control point. Any landmark with a recorded location can be used as a ground control point to create a GCP file.

Figure 2:
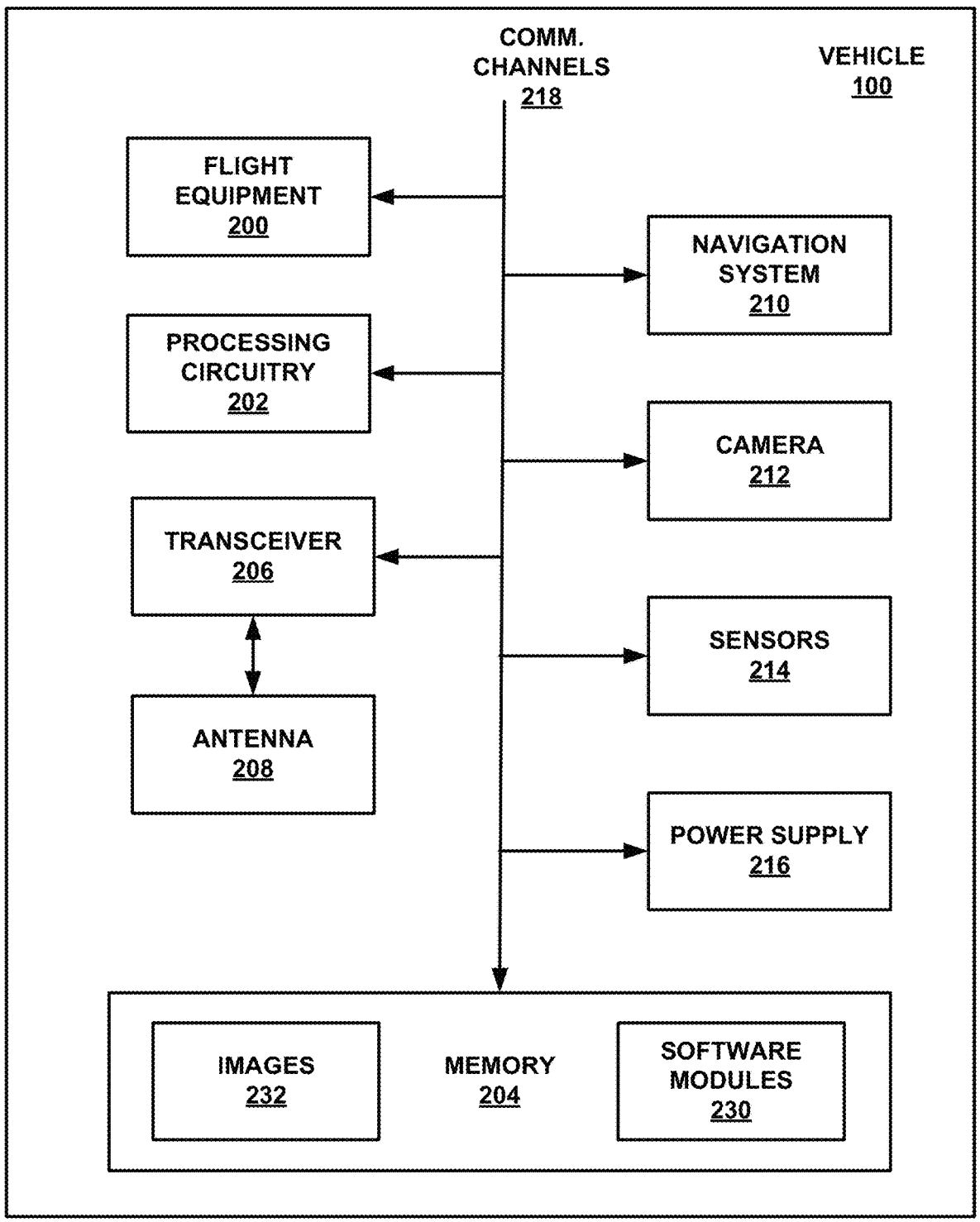
FIG. 2 is a block diagram illustrating example components of a vehicle that may be used to implement techniques of this disclosure.

FIG. 2 shows an example illustration of vehicle 100. Vehicle 100 includes flight equipment 200, processing circuitry 202, memory 204, transceiver 206, antenna 208, navigation system 210, camera 212, sensor 214, and power supply 216. Camera 212 is an example of one or more cameras 118 shown in FIG. 1.

Communication channels 218 interconnect each of flight equipment 200, processing circuitry 202, memory 204, transceiver 206, antenna 208, navigation system 210, camera 212, sensor 214, and power supply 216 for inter-component communications (physically, communicatively, and/or operatively). In some examples, communication channels 218 include a system bus, a network connection, an inter-process communication data structure, or any other method for communicating data, including various types of wireless communication technologies. Power supply 216 may provide electrical energy to each of the other components of vehicle 100. In some examples, power supply 216 is a battery.

Processing circuitry 202 is intended to represent all processing circuitry and all processing capabilities of vehicle 100. Processing circuitry 202 may, for example, include one or more DSPs, general purpose microprocessors, integrated circuits (ICs) or a set of ICs (e.g., a chip set), ASICs, FPGAs, or other equivalent integrated or discrete logic circuitry. The techniques of this disclosure may be performed at least partially by processing circuitry 202 located onboard vehicle 100. Additionally or alternatively, the techniques of this disclosure may be performed by processing circuitry 300 of inspection management system 190 shown in FIG. 3, which may be located remote from vehicle 100.

Memory 204 is intended to represent all of the various memory devices within vehicle 100. Memory 204 constitutes a computer-readable storage medium and may take the form of either a volatile memory that does not maintain stored contents once vehicle 100 is turned off or a non-volatile memory that stores contents for longer periods of time, including periods of time when vehicle 100 is an unpowered state.

The functionality of vehicle 100 is implemented by hardware, software, firmware, or combinations thereof. Memory 204 may store software modules 220 and/or firmware that include sets of instructions. Processing circuitry 202 and, other hardware components of vehicle 100, may execute the instructions of software modules 230 and/or firmware to perform the techniques of this disclosure. Additionally or alternatively, memory 304 of inspection management system 190 shown in FIG. 3 may store some or all of the instructions that, when executed, cause processing circuitry 202 and/or 300 to perform the techniques of this disclosure. Memory 204 can also store images 232 captured by camera 212, along with location and orientation data for each image.

The location and orientation data may indicate the location and orientation of camera 212 and/or vehicle 100 at the time that each of images 232 was captured. For example, vehicle 100 may be configured to transfer images 232 and the location and orientation data to an inspection management system during or after an inspection.

Transceiver 206 is configured to send and receive data using antenna 208 via one or more communication links, such as communication links 102, 104, and 106 shown in FIG. 1. Transceiver 206 may send and receive data according to any of the wireless communication protocols described elsewhere in this disclosure. For example, transceiver 206 may be configured to receive navigation instructions from a remote device such as device 110, 112, or 150 shown in FIG. 1. Additionally, transceiver 206 may be configured to send images 232 and other data to a computing system, such as devices 110 and 150 shown in FIG. 1, or devices 210, 212, and 250 shown in FIG. 2.

Navigation system 210 controls a flight path of vehicle 100 based on control signals received from a primary device, such as devices 110, 112, or 150 shown in FIG. 1. In some examples, navigation system 210 controls the flight path of vehicle 100 based on data stored in memory 204. For example, navigation system 210 may output signals to flight equipment 200 to instruct vehicle 100 to fly to predetermined image capture locations, to land, or to otherwise navigate to locations along a flight path of vehicle 100. Navigation system 210 may be configured to generate a flight path for vehicle 100 based on a previously created GCP file and/or a previously created and scaled three-dimensional model. The GCP file may have been previously created by processing circuitry onboard another vehicle or processing circuitry that is otherwise remote from vehicle 100.

Camera 212 may be configured to capture images 232 as infrared images and/or visible light images based on control signals received from a primary device, such as devices 110, 112, or 150 shown in FIG. 1. In some examples, the same camera captures both infrared images and visible light images. In other examples, vehicle 100 has separate cameras to capture infrared images and visible light images. Processing circuitry 202 may be configured to control camera 212.

Sensor 214 are intended to represent all the various sensors included in vehicle 100. Vehicle 100 may, for example, include one or more sensors used for flight management, such as accelerometers, gyroscopes, magnetometers, barometers, GNSS sensors, tilt sensors, inertial measurement sensors, speed sensors, and others. Sensor 214 may be configured to measure the location and orientation of vehicle 100 at the time that each image is captured by camera 212. Processing circuitry 202 can store the location and orientation to memory 204.

Figure 3:
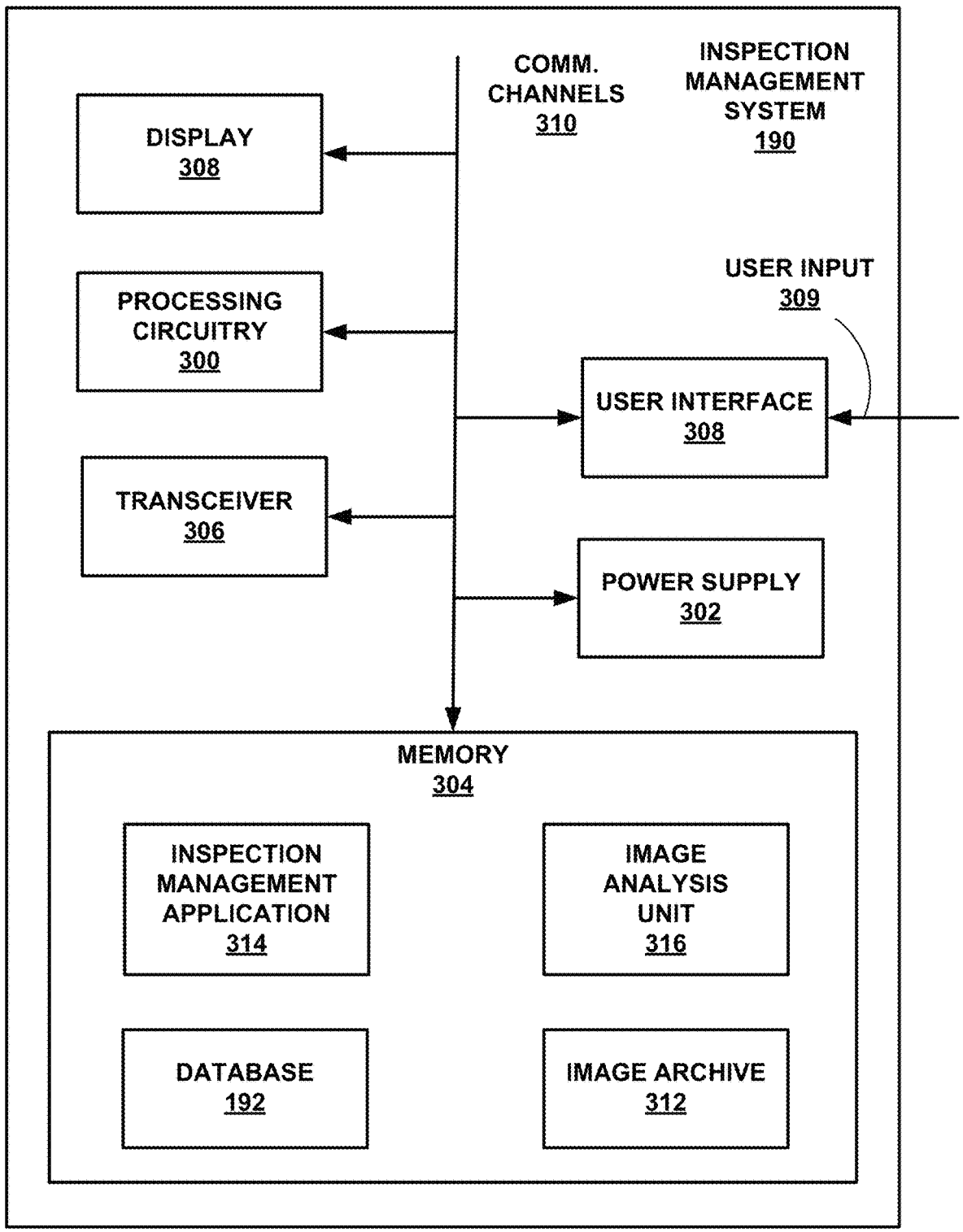
FIGS. 3 and 4 are block diagrams illustrating example components of an inspection management system, in accordance with a technique of this disclosure.
Figure 4:
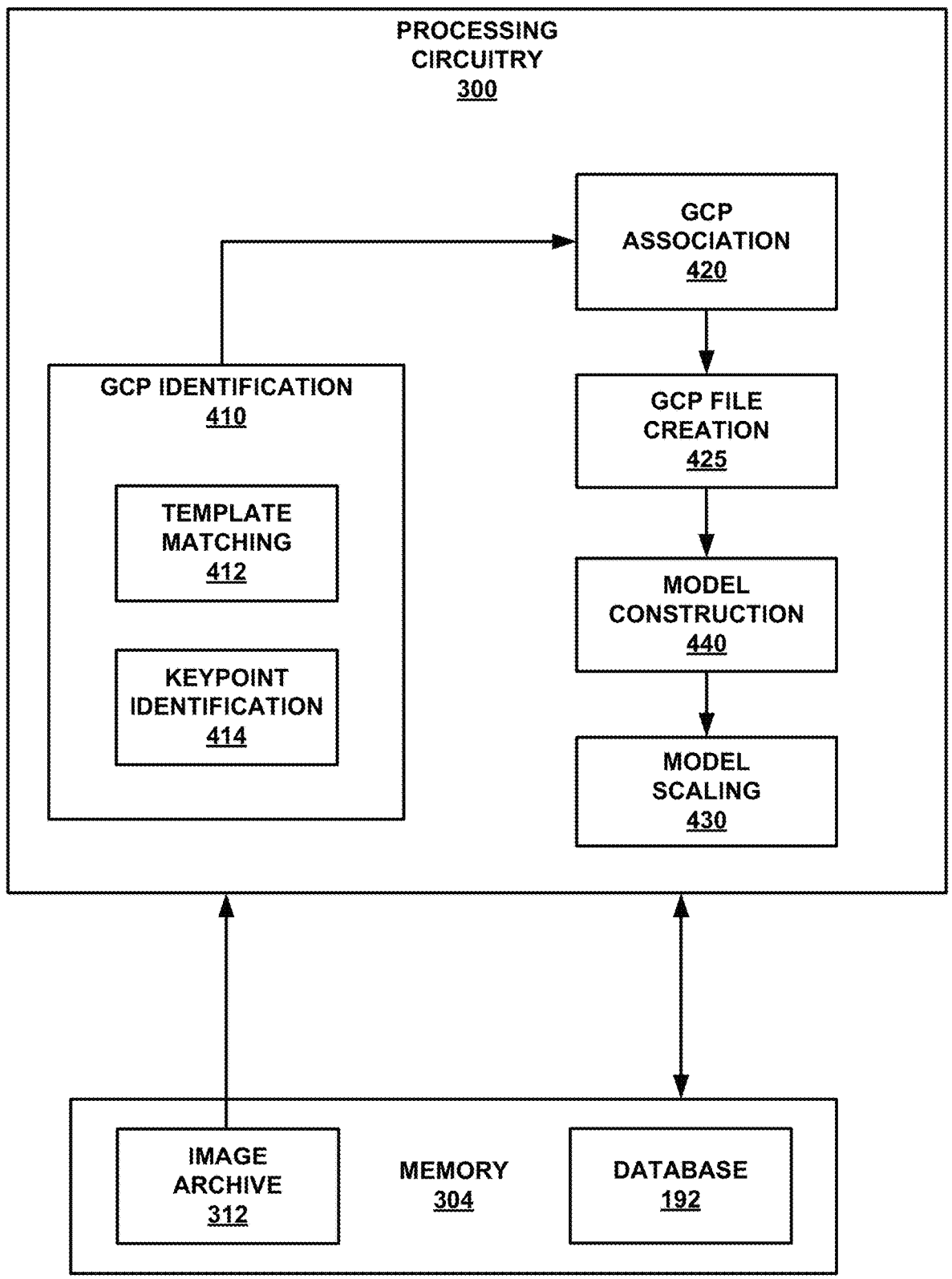

FIGS. 3 and 4 are block diagrams illustrating example components of an inspection management system 190, in accordance with a technique of this disclosure. In the example of FIG. 3, inspection management system 190 includes processing circuitry 300, power supply 302, memory 304, transceiver 306, and user interface 308. Communication channels 310 interconnect processing circuitry 300, power supply 302, user interface 303, memory 304, transceiver 306, and user interface 308. Power supply 302 provides power to processing circuitry 300, memory 304, user interface 303, transceiver 306 and user interface 308. Processing circuitry 300 and memory 304 may be implemented in a manner similar to processing circuitry 202 and memory 204 described above with respect to FIG. 2.

Transceiver 306 may comprise a network card, such as an Ethernet adaptor, wireless interface, or other device for sending and receiving data with other computing devices. In some examples, each of devices 110, 112, and 150 is configured to communicate directly with the others of devices 110, 112, and 150, rather than communicating through inspection management system 190. Inspection management system 190 may be configured to receive images captured by a camera onboard a vehicle by transceiver 306 and/or user interface 303, either of which may include a Universal Serial Bus (USB) port, an Ethernet port, and a wireless connection.

User interface 308 may be configured to present information to a user (e.g., a clinician). User interface 308 may include a display configured to present images captured during an inspection to a user. The display may be configured to also present a graphical user interface showing the contents of a GCP file and/or a three-dimensional model created based on the images. User interface 308 may include a monitor, cathode ray tube display, a flat panel display such as a liquid crystal (LCD) display, a plasma display, a light emitting diode (LED) display, and/or any other suitable display. User interface 308 may be part of a personal digital assistant, mobile phone, tablet computer, laptop computer, any other suitable computing device, or any combination thereof, with a built-in display or a separate display. User interface 308 may also include means for projecting audio to a user, such as speaker(s).

User interface 308 may include or be part of any suitable device for conveying such information, including a computer workstation, a server, a desktop, a notebook, a laptop, a handheld computer, a mobile device, or the like. In some examples, processing circuitry 300 may be part of the same device or supported within one housing (e.g., a computer or monitor). In other examples, processing circuitry 300 and user interface 308 may be separate devices configured to communicate through a wired connection or a wireless connection. User interface 308 may comprise various types of displays for outputting data, such as liquid crystal displays, plasma displays, light emitting diode (LED) displays, and so on. In other examples, inspection management system 190 may not include a display.

User interface 308 may be configured to receive user inputs 309 for transferring images to inspection management system 190 and/or for selecting one or more existing landmarks from database 192. In some examples, a user can provide user input 309 to inspection management system 190 to select a ground control point in an image stored in image archive 312. User input 309 can also be used for annotating images presented by user interface 308. User interface 308 may include a physical interface and/or a digital interface. A physical input device may include, for example, a touchscreen, touchpad, joystick, button, lever, trigger, steering wheel, mouse, keyboard, and/or other input device. In some examples, user interface 308 includes a virtual input device such as a screen displaying any number of digital structures, such as a button, slider, menu item, or other digital structure.

In the example of FIG. 3, memory 304 stores database 192, image archive 312, inspection management application 314, and image analysis unit 316. Database 192 stores data associated with inspection projects, as described elsewhere in this disclosure. For instance, database 192 may comprise tables and data associated with inspection tasks, inspectors, pilots, images, video, and so on. Inspection management application 314 may comprise software instructions that, when executed by processing circuits 300, cause inspection management system 190 to perform the inspection management functions described in this disclosure. In some examples, processing circuitry 300 may be part of a computing system that is not part of an inspection management application but is instead part of a point cloud generating application or a three-dimensional mapping application.

Image archive 312 can store images captured by a vehicle during an inspection or during an image capturing mission. For example, the vehicle may capture the images stored in image archive 312 for the purpose of creating a GCP file. Inspection management application 314 can include instructions for using the images to create an inspection report. Image analysis unit 316 can be executed by processing circuitry 300 to identify landmarks in the images. Additional example details of using image processing for inspection management applications can be found in commonly assigned U.S. Pat. No. 10,250,821, entitled "Generating a Three-Dimensional Model of an Industrial Plant Using an Unmanned Aerial Vehicle," issued on Apr. 2, 2019, commonly assigned U.S. Patent Application Publication No. 2019/0089861, entitled "Applying Features of Low-Resolution Data to Corresponding High-Resolution Data," filed on Dec. 20, 2017, commonly assigned International Patent Application Publication No. WO2019/144317, entitled "Solar Panel Inspection by Unmanned Aerial Vehicle," filed on Jan. 24, 2018, commonly assigned U.S. patent application Ser. No. 15/977,624, entitled "Transferring Annotations to Images Captured by Remote Vehicles Between Displays," filed May 11, 2018, commonly assigned U.S. patent application Ser. No. 16/365,214, entitled "Object of Interest Database Management Using Inspection Data," filed Mar. 26, 2019, and commonly assigned U.S. patent application Ser. No. 16/453,855, entitled "Dense Mapping Using Range Sensor Multi-Scanning and Multi-View Geometry from Successive Image Frames," filed on Jun. 26, 2019, each of which is incorporated by reference in its entirety.

Implementing image analysis unit 316, processing circuitry 300 may be configured to identify an existing landmark in an image from image archive 312. For example, processing circuitry 300 can use a template matching technique and/or any other image processing technique to identify the existing landmark by scanning the image for a template of the existing landmark. Processing circuitry 300 can then create a ground control point by associating one or more pixels in the images with a location of the existing landmark stored in database 192. Additional example details of image processing techniques and template matching can be found in commonly assigned U.S. patent application Ser. No. 16/169,879, entitled "Applying an Annotation to an Image Based on Keypoints," filed on Oct. 24, 2018, which is incorporated by reference in its entirety.

Although the techniques of this disclosure are described in terms of inspections, processing circuitry 300 can create a GCP file in other applications. For example, processing circuitry 300 can create a GCP file for a mapping application, where the model may represent an urban area or a tourist location. For example, processing circuitry 300 could create a GCP file of the Grand Canyon using images captured at different locations. Processing circuitry 300 could then create a three-dimensional model and determine the scaling for the model based on the GCP file by identifying ground control points using the known locations of existing landmarks stored to database 192. The ground control points could include points or structures that have previously been surveyed, such as poles, signs, benches, and/or any other ground control points. In examples in which the location of a ground control point is not known, processing circuitry 300 may be configured to determine the location of the ground control point based on the location and the orientation of the camera at the times that the images of the landmark were captured.

FIG. 4 shows an example configuration for processing circuitry 300 and memory 304. Processing circuitry 300 may be configured to implement ground control point identification 410 to identify one or more landmarks shown in images stored in image archive 312. In some examples, processing circuitry 300 can execute inspection management application 314 by performing ground control point identification 410, ground control point association 420, GCP file creation 425, model scaling 430, and/or model construction 440. Processing circuitry 300 may be configured to implement ground control point identification 410 by performing template matching 412 and/or keypoint identification 414.

Processing circuitry 300 can perform template matching 412 by scanning an image for a template or any other pattern associated with an existing landmark. Additionally or alternatively, processing circuitry 300 may be configured to check keypoints identified using keypoint identification 414 for a template of an existing landmark. The template may be any other pattern of pixels that is associated with the existing landmark. Thus, processing circuitry 300 can scan through an image comparing portions of the image to the template, working through the image either line by line or by splitting the image into regions and checking each region of the image.

For example, processing circuitry 300 can perform keypoint identification 414 by identifying unique image features in the images, such as edges of objects, corners of objects, and changes in color, light, or brightness across adjacent or proximate pixels. For example, processing circuitry 300 can detect a keypoint where there is a high variance in color, light, or brightness across adjacent or proximate pixels. The set of keypoint may include a block of pixels, where each keypoint includes a single pixel or a group of adjacent pixels. Processing circuitry 300 can use a keypoint detection method to determine each keypoint, where the keypoint detection method includes an edge detection algorithm, a corner detection algorithm, a speeded up robust features (SURF) feature descriptor, a scale-invariant feature transform (SIFT) feature descriptor, a Laplacian detection algorithm, a Hessian detection algorithm, a Harris detection algorithm, a features from accelerated segment test (FAST) detection algorithm, an oriented FAST and rotated binary robust independent elementary feature (ORB) descriptor, and/or any other suitable keypoint detection method.

In some examples, processing circuitry 300 can prompt a user via user interface 308 to select an existing landmark from a list of existing landmarks pulled from database 192. Processing circuitry 300 may be configured to present a list of the existing landmarks that are stored in database 192 and prompt the user to select an existing landmark. Processing circuitry 300 can determine a template or an image patch that is associated with the selected landmark. Processing circuitry 300 may be configured to perform template matching 412 by scanning an image for the template associated with the selected landmark.

Additionally or alternatively, processing circuitry 300 can present an image to the user and prompt the user to select a portion of the image from image archive 312. Processing circuitry 300 may be configured to compare the selected image portion to templates that are associated with the existing landmarks stored in database 192. Processing circuitry 300 may be configured to identify a landmark in response to matching the selected image portion to a template for an existing landmark. Processing circuitry 300 can then scan other images stored in image archive 312 for the template to identify the landmark in one or more of the other images. Thus, processing circuitry 300 can allow the user to select the landmark for use as a ground control point.

Processing circuitry 300 may be configured to automatically identify keypoints without any user input, which may make the three-dimensional model scaling process faster and more efficient. Processing circuitry 300 can also identify a landmark by performing keypoint identification 414 to identify a set of keypoints in an image. Processing circuitry 300 may be configured to check each keypoint of the set of keypoints for a match with any of the templates that are associated with the existing landmarks stored to database 192. For example, processing circuitry 300 can compare one or more keypoints from the set of keypoints to each template from database 192 to determine whether there is matching template in database 192. Processing circuitry 300 may be configured to implement an algorithm that is trained to identify signatures in images, where each signature may be associated with a ground control point. When a match is determined, processing circuitry 300 may be configured to scan other images stored in image archive 312 for the template to identify the landmark in one or more of the other images.

As another example, processing circuitry 300 may be configured to scan the images from image archive 312 for templates of standard landmarks, such as signs, poles, building features, electrical power distribution structures, roadway features, curbs, sidewalks, concrete or asphalt structures, and/or any other visible structures. Processing circuitry 300 can identify a landmark by matching a template to a feature in an image. In response to identifying a landmark, processing circuitry 300 can scan other images in image archive 312 for features that match the template to identify the landmark in the other images.

Additionally or alternatively, processing circuitry 300 may be configured to create a three-dimensional point cloud (e.g., a three-dimensional model) based on the images and locate the existing landmarks within the point cloud using database 192. For example, processing circuitry 300 can check database 192 for any existing landmarks that are located within the boundaries of the point cloud. Processing circuitry 300 can then scan the images for templates of those existing landmarks that are located within the boundaries of the point cloud. Processing circuitry 300 can focus on the images that show the area around the known location of the existing landmark when scanning for the template of the existing landmark. Processing circuitry 300 may be configured to scan for landmarks based on the type of inspection site. For example, if the inspection site is a solar farm, processing circuitry 300 may be configured to scan for a solar panel, and/or an electrical distribution line or box.

Thus, processing circuitry 300 may be configured to automatically determine a scaling for the three-dimensional model without a user having to select the existing landmark or select a portion of the image that shows a ground control point. After constructing the three-dimensional model, processing circuitry 300 can automatically identify landmarks without the user instructing inspection management system 190 about the appearance of the existing landmark or without the user providing a template of an existing landmark.

Processing circuitry 300 may be configured to perform ground control point association 420 to associate the landmarks identified in an image with the latitude, longitude, and altitude of the existing landmark, as determined using the locations and orientations of the one or more camera that captured the images. Processing circuitry 300 can create a file or an entry in a database of ground control points associated with the landmarks, where the file or entry includes the latitude, longitude, and altitude of the ground control point. The file or entry can also include the horizontal and vertical position of the ground control point in each image stored in image archive, along with the image filename(s) and the name of the landmark or asset. The horizontal and vertical position of the ground control point can each be a pixel value within the image that represents, for example, the center, centroid, or corner (e.g., upper-left corner) of the existing landmark shown in the image.

Processing circuitry 300 can use the identified ground control points for GCP file creation 425. Processing circuitry 300 can implement model construction 440 using the GCP file to construct a three-dimensional model based on the images stored to image archive 312. Processing circuitry 300 may be configured to perform model scaling 430 to determine a scaling for the three-dimensional model based on the contents of GCP file, which can include the ground control points for landmarks identified in at least two images. In some examples, the known location of the ground control point can be used by processing circuitry 300 to scale the three-dimensional model from unknown units to known units, such as feet or meters. Processing circuitry 300 can also use multiple ground control points associated with landmarks identified across multiple images to determine a scaling for the three-dimensional model. The ground control point(s) can also be used as an absolute reference for the three-dimensional model.

Figure 5:
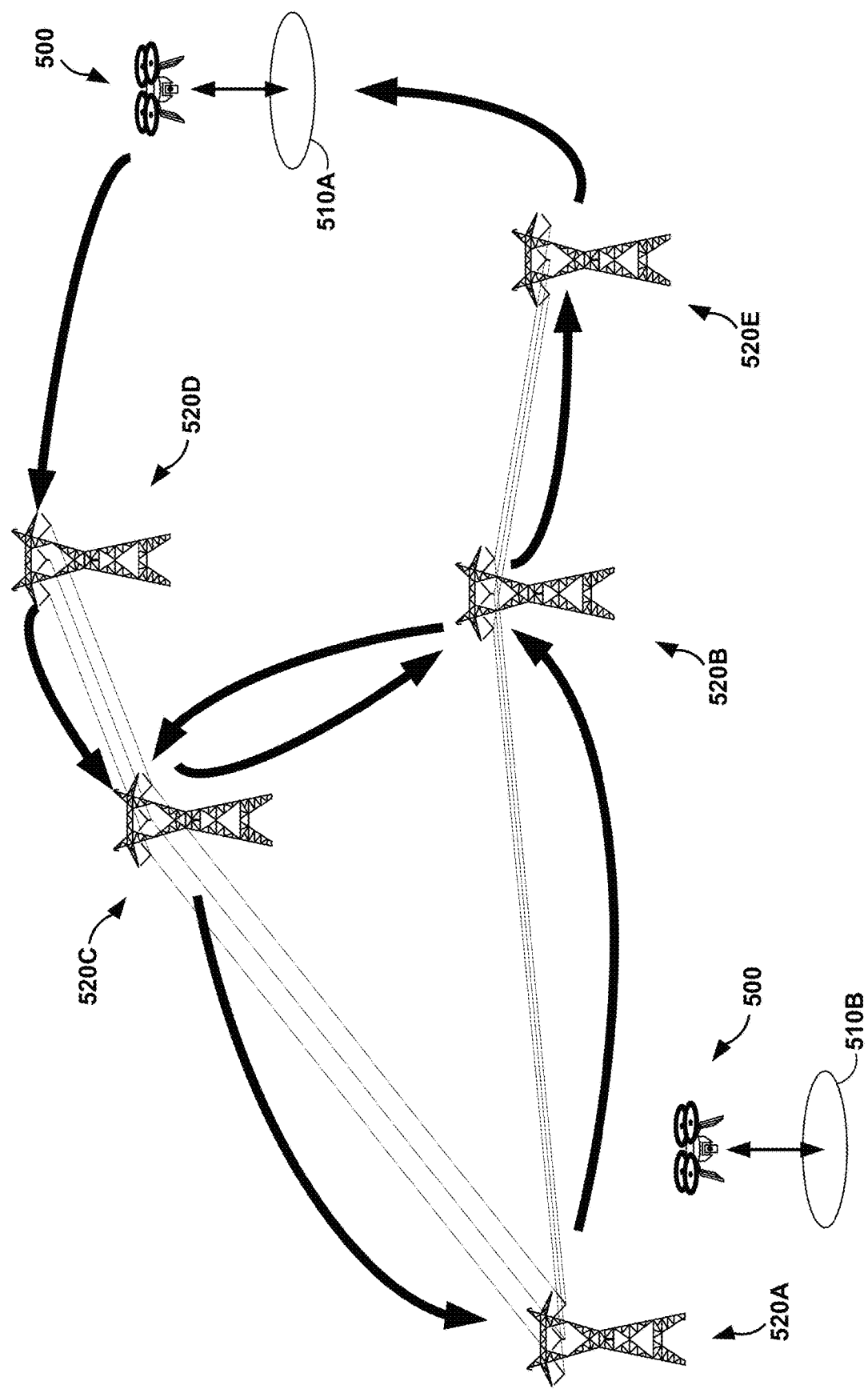
FIG. 5 is a conceptual diagram depicting an example inspection plan or image-captured mission, in accordance with some examples of this disclosure.

FIG. 5 is a conceptual diagram depicting an example inspection plan or image-captured mission, in accordance with some examples of this disclosure. Large-scale industrial companies, such as utilities, oil, and natural gas, may own hundreds of miles of connected assets 520A-520E (collectively, "assets 520"), for example, transmission infrastructure supporting one or more utilities. In the example depicted in FIG. 5, assets 520 are depicted as transmission towers for electric powerlines, however, assets 520 may include any type of extended asset infrastructure, such as powerlines, pipelines, wind turbines, data (e.g., fiber-optic) cables, roads, bridges, dams, or railroads. The location of each of assets 520, or a portion of each asset, may be stored to a database of existing landmarks. However, even without a pre-existing database of locations of ground control points, a computing system can construct a three-dimensional model using the techniques of this disclosure.

As shown in FIG. 5, assets 520 may include extensive infrastructure that needs to be inspected periodically to ensure high productivity. The overseeing company (or other controlling entity, such as a governmental administrative body) may employ small UAVs 500 to perform these periodic inspections due to the UAVs' ability to quickly collect high-quality data. The inspection, data-gathering mission, and/or image-capturing mission may use only one UAV 500 or may use multiple UAVs 500.

A computing system may be configured to identify landmarks in images of assets 520 and characterize the landmarks as ground control points. The computing system can identify a portion of asset 520A as a landmark if that portion is an existing landmark with a known location that is stored in a database. For example, an element of asset 520A may be used as a ground control point, such as an element that meets the ground surface or an element is that used to connect to an electrical transmission line.

UAV 500 is depicted in FIG. 5 as a quadcopter, but UAV 500 may be any type of UAV including, but not limited to, a rotorcraft, compound aircraft such as tilt-rotor, X2 and X3, an aerostat, or any other such type of UAV including all vertical take-off and landing (VTOL), tail-sitter, etc. UAV 500 may be configured to fly with various degrees of autonomy. In some examples, UAV 500 may use light detection and ranging (LIDAR) for collision avoidance. Although the techniques of this disclosure are not limited to any particular type of vehicle, such as any manned or unmanned vehicle or any aerial or non-aerial vehicle, UAV 500 may, for example, be a relatively small, low altitude, and low speed UAV, where in this context, small corresponds to under 55 pounds, low altitude corresponds to operating altitudes less than 400 feet above ground, and low air speed corresponds to air speeds less than 87 knots. Furthermore, it is contemplated that UAV 500 may have hovering capabilities, meaning UAV 500 may have the capability of remaining at an approximately constant location in the air.

A computing system may be configured to receive various data inputs and determine, based on the data inputs, a comprehensive asset-inspection plan satisfying one or more constraints or parameters and configured to achieve one or more inspection objectives. For example, the computing system can generate the inspection plan (e.g., travel path, route, or flight plan) based on a GCP file created using the techniques of this disclosure.

The asset-inspection plan may be sub-divided into a plurality of UAV flight segments, each flight segment defined by one or more UAV launch (e.g., takeoff and landing) locations 510A and 510B. For example, the inspection plan may be configured to avoid certain constraints such as a Federal Aviation Administration (FAA)-regulated no-fly zone. In other examples, the inspection plan may be configured to achieve one or more parameters, such as to reduce an overall cost associated with the inspection. For example, the inspection cost may be reduced by reducing a total travel distance between any or all of launch locations 510A and 510B, or by reducing a time duration spent conducting the inspection.

Figure 6:
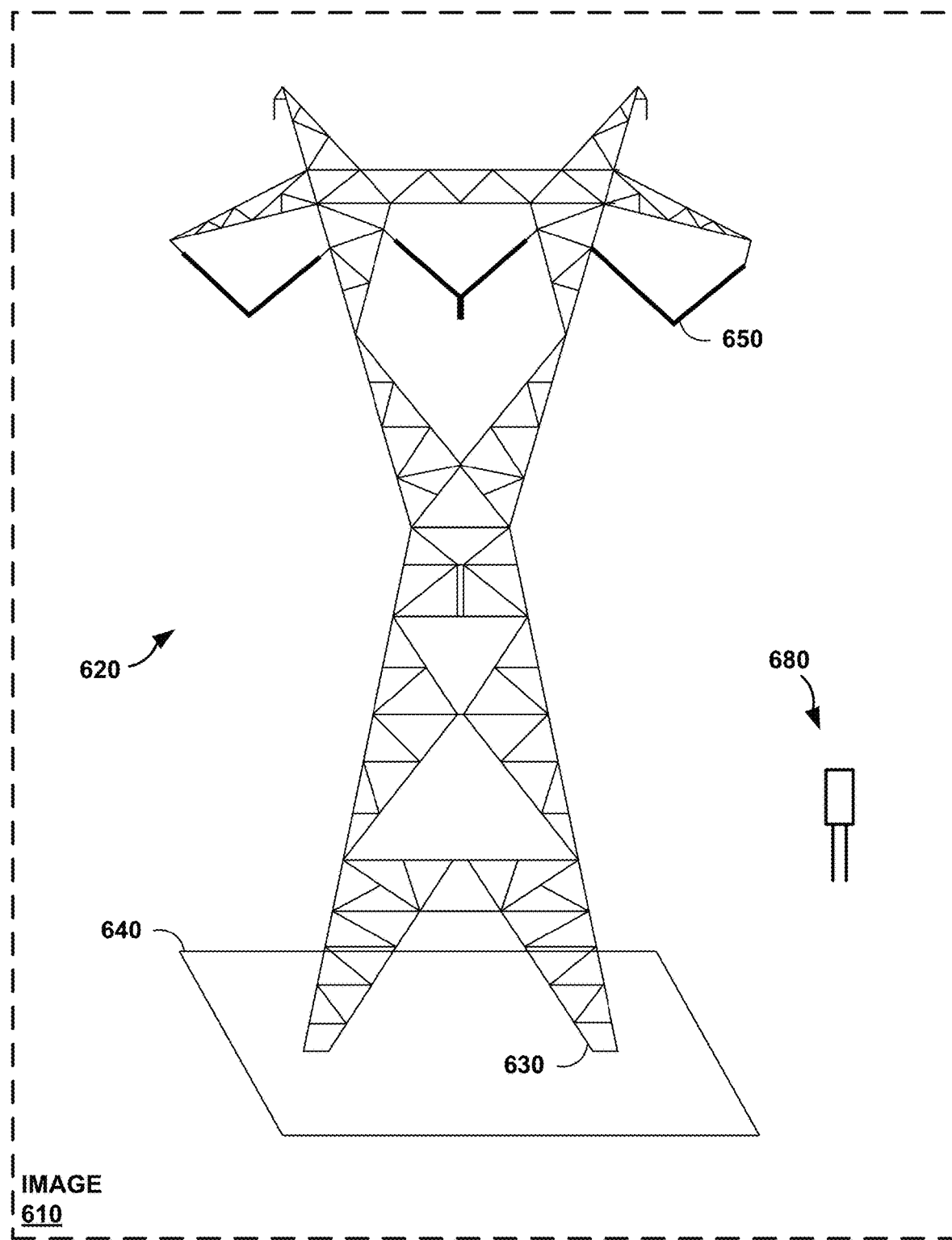
FIGS. 6-8 illustrate example images depicting existing landmarks, in accordance with some examples of this disclosure.
Figure 7:
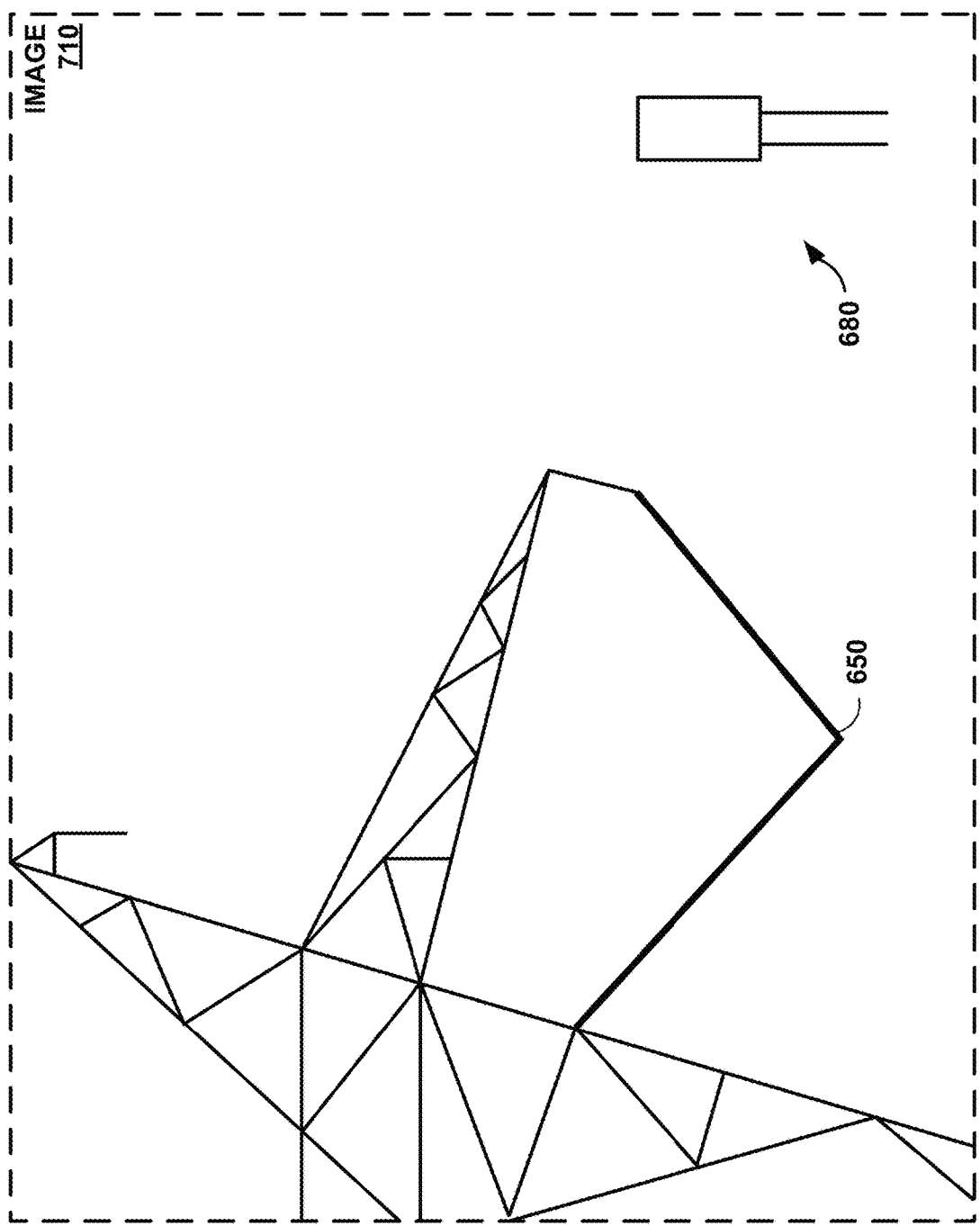
Figure 8:
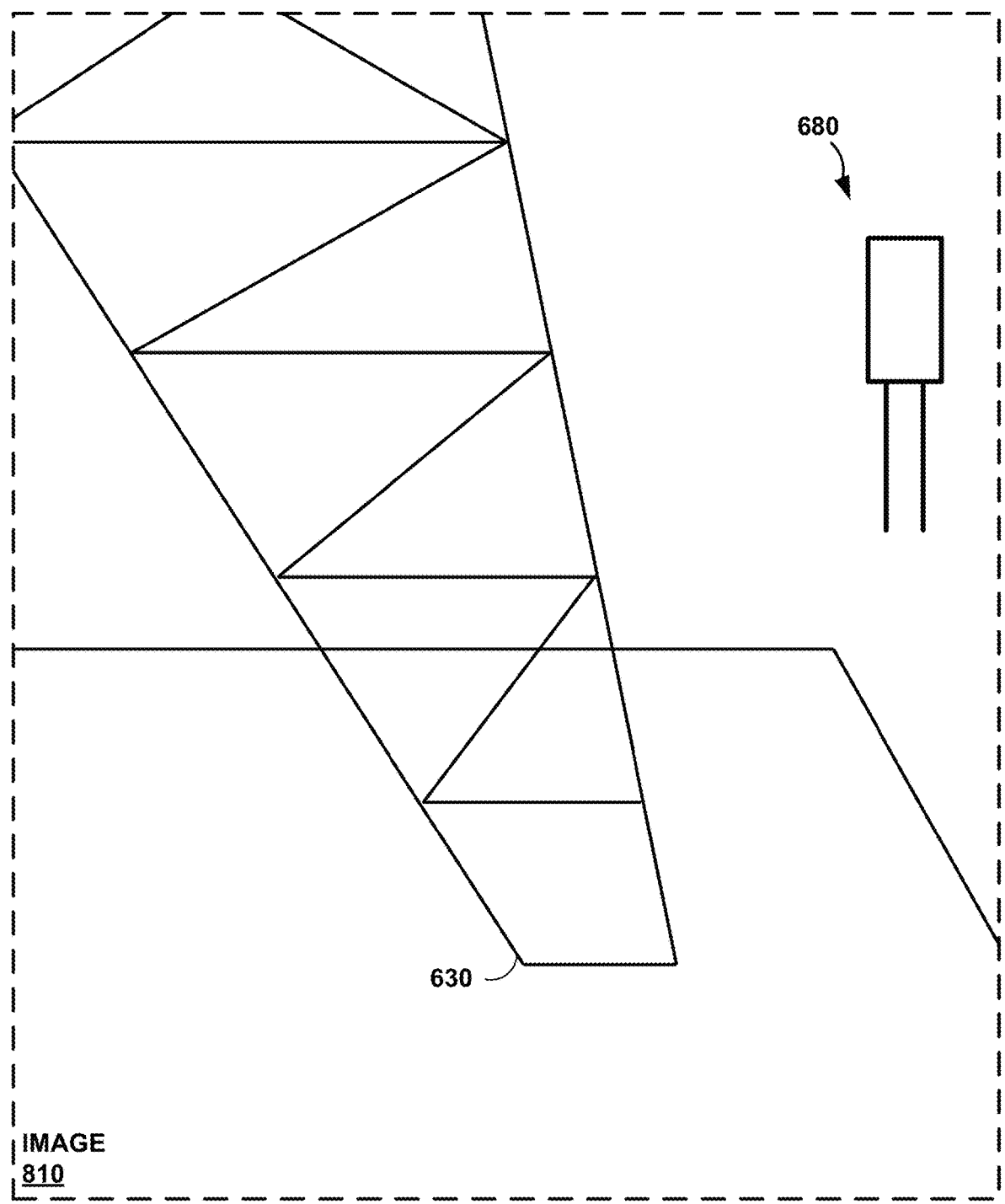

FIGS. 6-8 illustrate example images 610, 710, and 810 depicting existing landmarks, in accordance with some examples of this disclosure. A vehicle can capture images 610, 710, and 810 during an inspection of transmission tower 620 or during an image-capturing mission. Each of images 610, 710, and 810 is captured at a unique location, perspective, and zoom. The vehicle can store the location and orientation of the camera and/or vehicle at the time that each of images 610, 710, and 810 are captured. The locations and orientations can be used in creating a GCP file for landmarks in the area surrounding transmission tower 620.

The processing circuitry of a computing system can identify ground control points 630, 640, 650, and 680 in images 610, 710, and 810 using keypoint identification, template matching techniques, and/or any other image processing techniques. The processing circuitry can use a template or any other pattern associated with each of the existing landmarks to identify ground control points 630, 640, 650, and 680. Each of image 610, 710, and 810 shows more than one landmark associated with one of ground control points 630, 640, 650, and 680. For example, image 610 shows the landmarks associated with ground control points 630, 640, 650, and 680, while images 710 and 810 show one or more of these landmarks.

Ground control point 630 is a base element of transmission tower 620, where the base element meets the concrete pad. Ground control point 640 is a corner of the concrete pad on which transmission tower 620 stands. Ground control point 650 is an element of transmission tower 620 that connects to or holds an electrical transmission line. Ground control point 680 is a pole or a sign that is secured or attached to the ground near transmission tower 620. The locations of ground control points 630, 640, 650, and 680 may have been surveyed and recorded during a previous inspection or during the installation of transmission tower 620.

The pixel positions of ground control points 630, 640, 650, and 680 are different in each of images 610, 710, and 810. For example, ground control point 630 is shown in image 610 and 810 but not in image 710. The horizontal and vertical pixel position (e.g., the x- and y-coordinates) of ground control point 630 in image 610 is different than the horizontal and vertical pixel position of ground control point 630 in image 810. The processing circuitry can store the pixel positions of ground control point 630 as entries in a GCP file for ground control point 630. For example, the processing circuitry can add a first line or row for the horizontal pixel position of ground control point 630 in image 610, the vertical pixel position of ground control point 630 in image 610, the filename of image 610. The processing circuitry can add a second line or row for the horizontal pixel position of ground control point 630 in image 810, the vertical pixel position of ground control point 630 in image 810, the filename of image 810.

When a power company installs power poles and transmission towers, the power company may survey, record, and store the exact location of each pole and tower. The power company can store the location of each object (e.g., pole, tower, or portion thereof) in a database of existing landmarks. The object may also be referred to as an existing landmark or an asset that has one or more uniquely identifiable features shown in images, such as unique shapes and/or colors. The computing system can create a GCP file using images captured by a UAV, where the images may show one or more of the existing landmarks. If a computing system eventually constructs a three-dimensional model of the area, the computing system can use the GCP file to reference the model and to determine the scaling of the model.

A database that stores the locations of the objects can be referred to a pre-existing database of existing landmarks because the database may already be in existence before the GCP file is created. The computing system can use the database of the existing landmarks without having to use manually placed spatial markers that are placed solely for the purpose of functioning as a ground control point, such as stickers that are placed for the purpose of being a control point. The computing system can use a manually placed marker shown in images to construct a three-dimensional model if the predefined symbols of manually placed markers are available, but the techniques of this disclosure do not require manually placed spatial markers. Instead, the computing system can use existing landmarks that do not function solely as ground control points.

Figure 9:
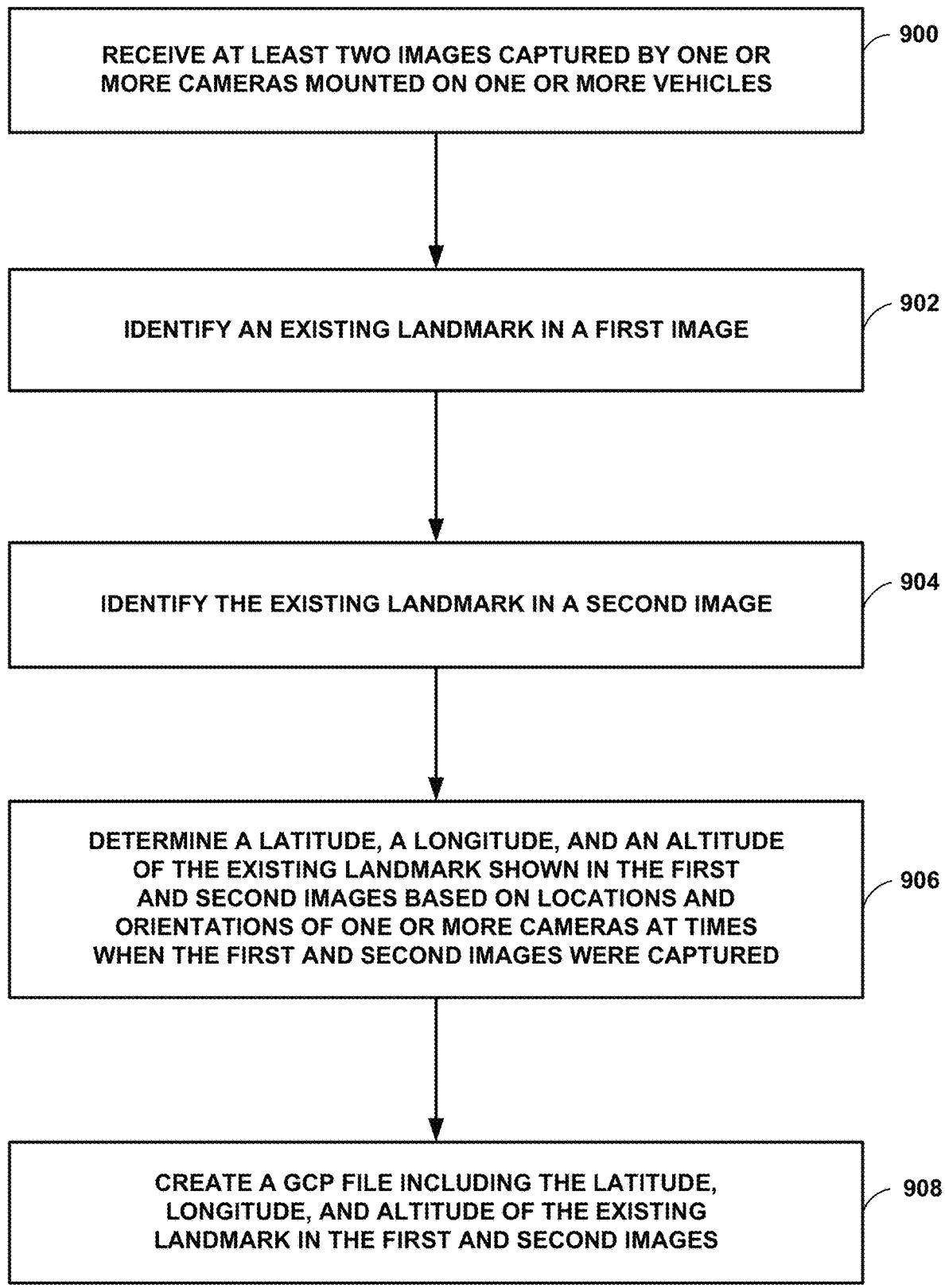
FIGS. 9 and 10 are flowcharts illustrating example processes for creating a ground control point file, in accordance with some examples of this disclosure.

FIG. 9 is a flowchart illustrating example process for creating a GCP file, in accordance with some examples of this disclosure. The example process of FIG. 9 is described with reference to processing circuitry 300 shown in FIGS. 3 and 4, although other components may exemplify similar techniques.

In the example of FIG. 9, processing circuitry 300 receives at least two images captured by one or more cameras mounted on one or more vehicles (900). Processing circuitry 300 can store the at least two images to image archive 312 in memory 304. Processing circuitry 300 can associate each image with the position and orientation of the camera onboard the UAV at the time that the image was captured.

In the example of FIG. 9, processing circuitry 300 identifies a landmark in a first image (902). To identify the landmark, processing circuitry 300 can search the first image for templates or any other patterns of the existing landmarks stored in database 192. In response to determining that a portion of the first image matches one of the templates, processing circuitry 300 can designate that portion of the first image as indicating the landmark.

Processing circuitry 300 can query database 192 to obtain the location data for the existing landmark. Processing circuitry 300 can characterize the landmark as a ground control point and then associate the ground control point with the location data. Processing circuitry 300 also identifies the landmark in the second image (904). Processing circuitry 300 can use the same template matching and/or keypoint identification process for both the first and second images. Processing circuitry 300 determines a latitude, longitude, and altitude of the ground control point shown in the first and second images based on the locations and orientations of the camera(a) at the times that the images were captured (906). Processing circuitry 300 can determine the location of the ground control point associated with the landmark using image processing techniques and/or triangulation techniques.

Although this disclosure describes using two images to identify a landmark and create a ground control point, processing circuitry 300 may be configured to use another number of images, such as three or five images. For example, processing circuitry 300 may be configured to identify the landmark in at least three images in order to create a ground control point. More than two images may be useful in examples in which a landmark-location database is not available for use during the ground control point creation process.

In the example of FIG. 9, processing circuitry 300 then creates a GCP file using the real-world location of the landmark associated with a ground control point and the pixel coordinates of the landmark in each image (908). Processing circuitry 300 can create an entry in the GCP file that includes a name or identifier for the ground control point, the latitude, longitude, and altitude of the existing landmark associated with the ground control point, and the pixel coordinates for the ground control point. Each ground control point may be associated with pixel coordinates in multiple images. For example, a ground control point may be associated with horizontal and vertical pixel coordinates in a first image (x1, y1), a second image (x2, y2), and a third image (x3, y3). The entry in the GCP file for the ground control point may include the pixel coordinates for all three images, along with a filename for each image.

Processing circuitry 300 can use the GCP file in the construction and/or scaling of a three-dimensional model or to create a travel plan for vehicle. For example, processing circuitry 300 may be configured to then constructs a three-dimensional model based on the at least two images and the latitude, longitude, and altitude of the ground control point. In constructing a three-dimensional model, processing circuitry 300 can use a mapping algorithm or application to combine the image data to form the three-dimensional model. Processing circuitry 300 can use the known location of the ground control point and the positions of the ground control point in the first and second images to determine a scaling for the three-dimensional model. The scaling may be a factor for converting from the arbitrary or unknown units of the three-dimensional model to actual units such as meters or feet. The ground control point can also provide an absolute reference for the three-dimensional model.

Figure 10:
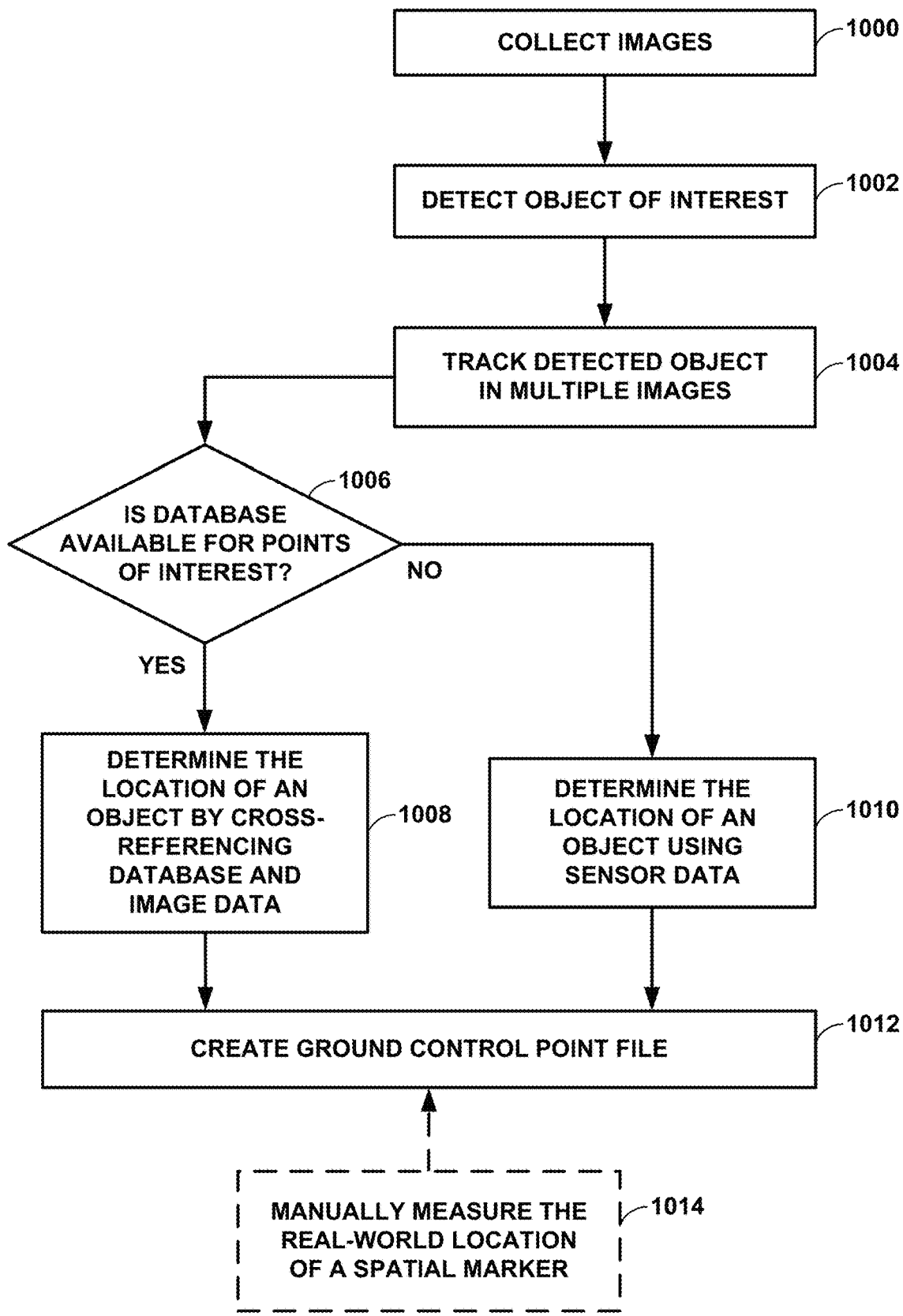

FIG. 10 is a flowchart illustrating example process for creating a GCP file, in accordance with some examples of this disclosure. The example process of FIG. 10 is described with reference to processing circuitry 300 shown in FIGS. 3 and 4, although other components may exemplify similar techniques.

In the example of FIG. 10, processing circuitry 300 receives a plurality of images from a vehicle (1000) and detects an object of interest (e.g., a landmark) in one of the images (1002). Processing circuitry 300 then tracks the detected object in multiple images by determining the pixel coordinates at which the object is shown in each image (1004). Processing circuitry 300 may be configured to identify the object in each using the image processing techniques described herein. Processing circuitry 300 check whether a database of points of interest is available (1006). If available, the database can include the locations of landmarks in an inspection area.

In the example of FIG. 10, if a database of existing landmarks is available (the "YES" branch of box 1006), processing circuitry 300 determines the location of an object by cross-referencing information from the database and image data (1008). For example, the database may include the latitude, longitude, and altitude of a landmark. Processing circuitry 300 may be configured to associate the latitude, longitude, and altitude of the landmark with pixel coordinates in an image, where the landmark is shown in the image at the pixel coordinates.

In the example of FIG. 10, if a database of existing landmarks is not available (the "NO" branch of box 1006), processing circuitry 300 determines the location of the object using sensor data from the vehicle (1010). For example, the vehicle may include sensors, in addition to the camera that captured the images, such as radar, lidar, ultrasound, laser, and/or any other sensors. An aircraft may include a downward facing ultrasonic sensor, a downward facing lidar, and/or a downward facing single beam distance measurement sensor configured to determine the location of the aircraft. A downward facing sensor may be configured to function in a manner similar to an altimeter. The sensor data can also include data from a GNSS device, INS device, and/or any other device for sensing the position and orientation of the vehicle. Processing circuitry 300 determine the location of a landmark shown in multiple images based the locations and orientations of the vehicle(s) at the time that each image was captured.

Processing circuitry 300 may be configured to then cross-reference the determined location of the landmark and the pixel coordinates at which the landmark is shown in each image. Processing circuitry 300 can associate the pixel coordinates in a first image with the latitude, longitude, and altitude of the landmark, as determined from the sensor data in step 1010.

In the example of FIG. 10, processing circuitry 300 creates a GCP file that includes the real-world location and pixel coordinates of each GCP (1012). The GCP file may include the latitude, longitude, and altitude of a landmark, along with the x- and y-pixel coordinates for each image in which processing circuitry 300 has detected the landmark. The latitude, longitude, and altitude of the landmark can be determined using a pre-existing database and/or using sensor data indicating the location and orientation of a camera when each image was captured. The pixel coordinates can be determined using image processing techniques to identify the landmark in each image.

Processing circuitry 300 may be configured to store the GCP file to memory 304 or an external memory. In some examples, processing circuitry 300 is configured to present the data in the GCP file via a display of user interface 308. Additionally or alternatively, processing circuitry 300 may be configured to construct a three-dimensional model using the GCP file. Processing circuitry 300 may also be capable of determining a scaling for the three-dimensional model based on the GCP file.

In addition to determining the location of a landmark using a pre-existing database or sensor data, processing circuitry 300 can also use manually measured locations of manually placed spatial markers (1014). The techniques of this disclosure do not require the use of manually placed spatial markers with predefined symbols (e.g., an X, cross, or bar code), but processing circuitry 300 may be configured to identify a manually placed spatial marker in an image where such spatial markers are available. Thus, manually placed spatial markers can supplement the use of pre-existing databases and sensor data to determine the locations of landmarks.

Processing circuitry 300 may be configured to determine whether there is an available pre-existing database of landmark locations. In response to determining that a pre-existing database is available, processing circuitry 300 may be configured to check the database for the location of a particular existing landmark. Processing circuitry 300 can use the location stored in the database if the location is available. However, in response to determining that the location of the particular existing landmark is not stored in the database, or in response to determining that the pre-existing database is not available, processing circuitry 300 may be configured to determine the location of a landmark based on the locations and orientations of the cameras when the images of the landmark were captured.

The following numbered examples demonstrate one or more aspects of the disclosure.

Example 1. This disclosure describes a system for creating a GCP file based on images captured by one or more cameras mounted on one or more vehicles. The system includes a memory configured to store a first image and a second image captured by the one or more cameras and store locations and orientations of the one or more cameras at times when the first and second images were captured. The system also includes processing circuitry configured to identify a first existing landmark in the first image and to identify the first existing landmark in the second image. The processing circuitry is further configured to determine a latitude, a longitude, and an altitude of the first existing landmark shown in the first and second images based on the locations and the orientations of the one or more cameras at the times when the first and second images were captured. The processing circuitry is configured to create the GCP file including the latitude, longitude, and altitude of the first existing landmark and pixel coordinates of the first existing landmark in the first and second images.

Example 2. The system of example 1, wherein the memory is further configured to store a third image and a fourth image captured by the one or more cameras. The memory is also configured to store locations and orientations of the one or more cameras at times when the third and fourth images were captured.

Example 3. The system of example 1 or example 2, wherein the processing circuitry is further configured to identify a second existing landmark in the third image.

Example 4. The system of examples 1-3 or any combination thereof, wherein the processing circuitry is further configured to identify the second existing landmark in the fourth image.

Example 5. The system of examples 1-4 or any combination thereof, wherein the processing circuitry is further configured to determine a latitude, a longitude, and an altitude of the second existing landmark shown in the third and fourth images based on the locations and the orientations of the one or more cameras at the times when the third and fourth images were captured.

Example 6. The system of examples 1-5 or any combination thereof, wherein the processing circuitry is configured to store the latitude, longitude, and altitude of the second existing landmark and pixel coordinates of the second existing landmark in the third and fourth images to the GCP file.

Example 7. The system of examples 1-6 or any combination thereof, where the processing circuitry is further configured to determine whether the latitude, longitude, and altitude of the first existing landmark are stored in a pre-existing database of existing landmarks.

Example 8. The system of examples 1-7 or any combination thereof, where the processing circuitry is further configured to, in response to determining that the latitude, longitude, and altitude of the first existing landmark are stored in the pre-existing database, copy the latitude, longitude, and altitude of the first existing landmark from the pre-existing database to the GCP file.

Example 9. The system of examples 1-8 or any combination thereof, where the processing circuitry is further configured to determine the latitude, longitude, and altitude of the first existing landmark based on the locations and the orientations of the one or more cameras at the times when the first and second images were captured in response to determining that the latitude, longitude, and altitude of the first existing landmark are not stored in the pre-existing database.

Example 10. The system of examples 1-9 or any combination thereof, where the processing circuitry is further configured to determine the locations and orientations of the one or more cameras at times when the first and second images were captured based on data from one or more sensors on the one or more vehicles, the one or more sensors comprising a radar sensor, a lidar sensor, or an ultrasound sensor.

Example 11. The system of examples 1-10 or any combination thereof, where the processing circuitry is further configured to construct a three-dimensional model based on the first image, the second image, and the GCP file.

Example 12. The system of examples 1-11 or any combination thereof, where the processing circuitry is further configured to determine that no manually placed spatial markers are shown in the first and second images and to search for the first existing landmark in the first and second images in response to determining that no manually placed spatial markers are shown in the first and second images.

Example 13. The system of examples 1-12 or any combination thereof, wherein the processing circuitry is configured to identify the first existing landmark in the first image by identifying the first existing landmark in the first image without using a manually placed spatial marker.

Example 14. The system of examples 1-13 or any combination thereof, wherein the processing circuitry is configured to identify the first existing landmark in the second image by identifying the first existing landmark in the second image without using a manually placed spatial marker.

Example 15. The system of examples 1-14 or any combination thereof, wherein the processing circuitry is further configured to determine a route for another vehicle based on the GCP file.

Example 16. The system of examples 1-15 or any combination thereof, wherein the processing circuitry is further configured to control the other vehicle based on the route for the other vehicle.

Example 17. The system of examples 1-16 or any combination thereof, wherein the processing circuitry is further configured to transmit the route for the other vehicle to another computing device, wherein the other computing device controls movement of the vehicle.

Example 18. The system of examples 1-17 or any combination thereof, wherein the processing circuitry is further configured to receive user input selecting the first existing landmark from a pre-existing database of existing landmarks.

Example 19. The system of examples 1-18 or any combination thereof, wherein the processing circuitry is further configured to identify the first existing landmark by scanning the first image for a template of the first existing landmark.

Example 20. The system of examples 1-19 or any combination thereof, wherein the processing circuitry is further configured to identify the first existing landmark by identifying a set of keypoints in the first image and by checking each keypoint of the set of keypoints for templates stored in a pre-existing database of existing landmarks.

Example 21. The system of examples 1-20 or any combination thereof, wherein the first existing landmark comprises a power transmission pole, a power transmission tower, a communication tower, a wind turbine, a solar panel, a chimney, or a portion of a building shown in the first image.

Example 22. The system of examples 1-21 or any combination thereof, wherein the processing circuitry is further configured to determine a type of inspection site where the one or more cameras captured the first and second images.

Example 23. The system of examples 1-22 or any combination thereof, wherein the processing circuitry is further configured to select the first existing landmark from a set of existing landmarks based on the type of inspection site.

Example 24. The system of examples 1-23 or any combination thereof, wherein the processing circuitry is configured to identify the first existing landmark by scanning the first image for a template of the selected first existing landmark.

Example 25. The system of examples 1-24 or any combination thereof, wherein the processing circuitry is further configured to identify the first existing landmark in the first image by matching a pattern associated with the first existing landmark to a first set of keypoints in the first image.

Example 26. The system of examples 1-25 or any combination thereof, wherein the processing circuitry is configured to identify the first existing landmark in the second image by matching the pattern associated with the first existing landmark to a second set of keypoints in the second image.

Example 27. The system of examples 1-26 or any combination thereof, wherein the processing circuitry is further configured to associate the first existing landmark with a filename of the first image, a horizontal pixel value in the first image, and a vertical pixel value in the first image.

Example 28. The system of examples 1-27 or any combination thereof, wherein the processing circuitry is further configured to associate the first existing landmark with a filename of the second image, a horizontal pixel value in the second image, and a vertical pixel value in the second image.

Example 29. The system of examples 1-28 or any combination thereof, further including an inspection management system comprising the processing circuitry.

Example 30. The system of examples 1-29 or any combination thereof, wherein the images are captured by the one or more vehicles during an inspection.

Example 31. A method includes creating a GCP file based on images captured by one or more cameras mounted on one or more vehicles. The method also includes receiving, at processing circuitry, a first image and a second image from the one or more cameras and determining, by the processing circuitry, locations and orientations of the one or more cameras at times when the first and second images were captured. The method further includes identifying, by the processing circuitry, an existing landmark in the first image and identifying the existing landmark in the second image based on the existing landmark shown in the second image. The method includes determining, by the processing circuitry, a latitude, a longitude, and an altitude of the existing landmark shown in the first and second images based on the locations and the orientations of the one or more cameras at the times when the first and second images were captured. The method further includes creating, by the processing circuitry, the GCP file based on the first image, the second image, and the latitude, the longitude, and the altitude of the existing landmark.

Example 32. The method of example 31, further including receiving a third image and a fourth image from the one or more cameras.

Example 33. The method of example 31 or example 30, further including determining locations and orientations of the one or more cameras at times when the first and second images were captured.

Example 34. The method of examples 31-31 or any combination thereof, further including identifying a second existing landmark in the third image based on a second existing landmark shown in the third image.

Example 35. The method of examples 31-32 or any combination thereof, further including identifying a second existing landmark in the fourth image based on the second existing landmark shown in the fourth image.

Example 36. The method of examples 31-33 or any combination thereof, further including a latitude, a longitude, and an altitude of the second existing landmark shown in the third and fourth images based on the locations and the orientations of the one or more cameras at the times when the third and fourth images were captured.

Example 37. The method of examples 31-34 or any combination thereof, wherein creating the GCP file is based on the first, second, third, and fourth images and the latitudes, longitudes, and altitudes of the first and second existing landmarks.

Example 38. The method of examples 31-35 or any combination thereof, further including determining that the latitude, longitude, and altitude of the first existing landmark are stored in a pre-existing database of existing landmarks.

Example 39. The method of examples 31-36 or any combination thereof, further including, in response to determining that the latitude, longitude, and altitude of the first existing landmark are stored in the pre-existing database, copying the latitude, longitude, and altitude of the first existing landmark from the pre-existing database to the GCP file.

Example 40. The method of examples 31-37 or any combination thereof, further including determining the latitude, longitude, and altitude of the first existing landmark based on the locations and the orientations of the one or more cameras at the times when the first and second images were captured in response to determining that the latitude, longitude, and altitude of the first existing landmark are not stored in the pre-existing database.

Example 41. The method of examples 31-38 or any combination thereof, further including determining the locations and orientations of the one or more cameras at times when the first and second images were captured based on data from one or more sensors on the one or more vehicles, the one or more sensors comprising a radar sensor, a lidar sensor, or an ultrasound sensor.

Example 42. The method of examples 31-39 or any combination thereof, wherein identifying the first existing landmark in the first image includes identifying the first existing landmark in the first image without using a manually placed spatial marker.

Example 43. The method of examples 31-40 or any combination thereof, wherein identifying the first existing landmark in the second image includes identifying the first existing landmark in the second image without using a manually placed spatial marker.

Example 44. The method of examples 31-41 or any combination thereof, further including determining a route for another vehicle based on the GCP file.

Example 45. The method of examples 31-42 or any combination thereof, further including controlling the other vehicle based on the route for the other vehicle.

Example 46. The method of examples 31-43 or any combination thereof, further including transmitting the route for the other vehicle to another computing device, wherein the other computing device controls movement of the vehicle.

Example 47. The method of examples 31-44 or any combination thereof, further including receiving user input selecting the first existing landmark from a pre-existing database of existing landmarks.

Example 48. The method of examples 31-45 or any combination thereof, wherein identifying the first existing landmark comprises scanning the first image for a template of the first existing landmark.

Example 49. The method of examples 31-46 or any combination thereof, further including identifying the first existing landmark comprises identifying a set of keypoints in the first image and by checking each keypoint of the set of keypoints for templates stored in a pre-existing database of existing landmarks.

Example 50. The method of examples 31-47 or any combination thereof, wherein the first existing landmark comprises a power transmission pole, a power transmission tower, a communication tower, a wind turbine, a solar panel, a chimney, or a portion of a building shown in the first image.

Example 51. The method of examples 31-48 or any combination thereof, further including determining a type of inspection site where the one or more cameras captured the first and second images.

Example 52. The method of examples 31-49 or any combination thereof, further including selecting the first existing landmark from a set of existing landmarks based on the type of inspection site.

Example 53. The method of examples 31-50 or any combination thereof, wherein identifying the first existing landmark comprises scanning the first image for a template of the selected first existing landmark.

Example 54. The method of examples 31-51 or any combination thereof, wherein identifying the first existing landmark in the first image comprises matching a pattern associated with the first existing landmark to a first set of keypoints in the first image.

Example 55. The method of examples 31-52 or any combination thereof, wherein identifying the first existing landmark in the second image comprises matching the pattern associated with the first existing landmark to a second set of keypoints in the second image.

Example 56. The method of examples 31-53 or any combination thereof, further including associating the first existing landmark with a filename of the first image, a horizontal pixel value in the first image, and a vertical pixel value in the first image.

Example 57. The method of examples 31-54 or any combination thereof, further including associating the first existing landmark with a filename of the second image, a horizontal pixel value in the second image, and a vertical pixel value in the second image.

Example 58. The method of examples 31-55 or any combination thereof, wherein the images are captured by the one or more vehicles during an inspection.

Example 59. A device includes a computer-readable medium having executable instructions stored thereon, configured to be executable by processing circuitry for causing the processing circuitry to perform the method of examples 31-58 or any combination thereof.

Example 60. A system includes means for creating a GCP file based on images captured by one or more cameras mounted on one or more vehicles. The system also includes means for receiving a first image and a second image from the one or more cameras and means for determining locations and orientations of the one or more cameras at times when the first and second images were captured. The system further includes means for identifying an existing landmark in the first image based on an existing landmark shown in the first image and means for identifying the existing landmark in the second image based on the existing landmark shown in the second image. The system includes means for determining a latitude, a longitude, and an altitude of the existing landmark shown in the first and second images based on the locations and the orientations of the one or more cameras at the times when the first and second images were captured. The system further includes means for creating the GCP file based on the first image, the second image, and the latitude, the longitude, and the altitude of the existing landmark.

Example 61. The system of example 60, further including means for performing method of examples 31-58 or any combination thereof.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, including those attributed to vehicle 100, devices 110,112, and 150, inspection management system 190, database 192, network 194, processing circuitry 202 and 300, camera 212, memories 204 and 304, and user interface 308, and various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between vehicle 100, devices 110, 112, and 150, inspection management system 190, database 192, network 194, processing circuitry 202 and 300, camera 212, memories 204 and 304, and user interface 308. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, vehicle 100, devices 110, 112, and 150, inspection management system 190, database 192, network 194, processing circuitry 202 and 300, camera 212, memories 204 and 304, and user interface 308, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A system for creating a ground control point (GCP) file based on images captured by one or more cameras mounted on one or more vehicles, the system comprising:
   a memory configured to:
      store a first image captured by the one or more cameras; and
      store a second image captured by the one or more cameras, wherein the second image has at least a threshold amount of overlap with the first image; and
      store locations and orientations of the one or more cameras at times when the first and second images were captured; and
   processing circuitry configured to:
      determine a first location and a first orientation of the one or more cameras at a time when the first image was captured;
      determine a second location and a second orientation of the one or more cameras at a time when the second image was captured;
      identify a first existing landmark in the first image;
      identify the first existing landmark in the second image;
      determine a latitude, a longitude, and an altitude of the first existing landmark shown in the first and second images based on the first and second locations, and the first and second orientations; and
      create the GCP file including the latitude, longitude, and altitude of the first existing landmark and pixel coordinates of the first existing landmark in the first and second images.

2. The system of claim 1, wherein the processing circuitry is further configured to:
   determine whether the latitude, longitude, and altitude of the first existing landmark are stored in a pre-existing database of existing landmarks; and
   in response to determining that the latitude, longitude, and altitude of the first landmark are stored in the pre-existing database, copy the latitude, longitude, and altitude of the first existing landmark from the pre-existing database to the GCP file.

3. The system of claim 2, wherein the processing circuitry is further configured to determine the latitude, longitude, and altitude of the first existing landmark based on the locations and the orientations of the one or more cameras at the times when the first and second images were captured in response to determining that the latitude, longitude, and altitude of the first existing landmark are not stored in the pre-existing database.

4. The system of claim 1,
   wherein the processing circuitry is further configured to determine the locations and orientations of the one or more cameras at the times when the first and second images were captured based on data from one or more sensors on the one or more vehicles, and wherein the one or more sensors comprise a radar sensor, a lidar sensor, or an ultrasound sensor.

5. The system of claim 1,
wherein the memory is further configured to:
store a third image and a fourth image captured by the one or more cameras; and
store locations and orientations of the one or more cameras at times when the third and fourth images were captured, and
wherein the processing circuitry is further configured to:
identify a second existing landmark in the third image;
identify the second existing landmark in the fourth image;
determine a latitude, a longitude, and an altitude of the second existing landmark shown in the third and fourth images based on the locations and the orientations of the one or more cameras at the times when the third and fourth images were captured; and
store the latitude, longitude, and altitude of the second existing landmark and pixel coordinates of the second existing landmark in the third and fourth images to the GCP file.

6. The system of claim 1, wherein the processing circuitry is further configured to:
construct a three-dimensional model based on the first image, the second image, and the GCP file; and
determine a route for another vehicle based on the GCP file and based on the three-dimensional model.

7. The system of claim 6, wherein the processing circuitry is further configured to:
control the other vehicle based on the route for the other vehicle; or
transmit the route for the other vehicle to another computing device, wherein the other computing device controls movement of the vehicle.

8. The system of claim 1,
wherein the processing circuitry is configured to identify the first existing landmark in the first image by identifying the first existing landmark in the first image without using a manually placed spatial marker, and
wherein the processing circuitry is configured to identify the first existing landmark in the second image by identifying the first existing landmark in the second image without using a manually placed spatial marker.

9. The system of claim 1,
wherein the processing circuitry is further configured to receive user input selecting the first existing landmark from a pre-existing database of existing landmarks, and
wherein the processing circuitry is configured to identify the first existing landmark by scanning the first image for a template of the first existing landmark.

10. The system of claim 1, wherein the processing circuitry is configured to identify the first existing landmark by:
identifying a set of keypoints in the first image; and
checking each keypoint of the set of keypoints for templates stored in a pre-existing database of existing landmarks.

11. The system of claim 1,
wherein the first existing landmark comprises a power transmission pole, a power transmission tower, a communication tower, a wind turbine, a solar panel, a chimney, or a portion of a building shown in the first image,
wherein the processing circuitry is further configured to:
determine a type of inspection site where the one or more cameras captured the first and second images; and
select the first existing landmark from a set of existing landmarks based on the type of inspection site, and
wherein the processing circuitry is configured to identify the first existing landmark by scanning the first image for a template of the selected first existing landmark.

12. The system of claim 1, wherein the processing circuitry is configured to store the pixel coordinates by:
storing a filename of the first image, a horizontal pixel value in the first image, and a vertical pixel value in the first image; and
associate the first existing landmark with a filename of the second image, a horizontal pixel value in the second image, and a vertical pixel value in the second image.

13. A method for creating a ground control point (GCP) file based on images captured by one or more cameras mounted on one or more vehicles, the method comprising:
receiving, at processing circuitry, a first image and a second image from the one or more cameras;
determining, by the processing circuitry, a first location and a first orientation of the one or more cameras at a time when the first image was captured;
determining, by the processing circuitry, a second location and a second orientation of the one or more cameras at a time when the second image was captured;
identifying, by the processing circuitry, a first existing landmark in the first image based on a first existing landmark shown in the first image;
identifying, by the processing circuitry, the first existing landmark in the second image based on the first existing landmark shown in the second image;
determining, by the processing circuitry, a latitude, a longitude, and an altitude of the first existing landmark shown in the first and second images based on the first and second locations, and the orientations; and
creating, by the processing circuitry, the GCP file including the latitude, longitude, and altitude of the first existing landmark and pixel coordinates of the first existing landmark in the first and second images.

14. The method of claim claim 13, further comprising:
determining whether the latitude, longitude, and altitude of the first existing landmark are stored in a pre-existing database of existing landmarks; and
in response to determining that the latitude, longitude, and altitude of the first existing landmark are stored in the pre-existing database, copying the latitude, longitude, and altitude of the first existing landmark from the pre-existing database to the GCP file.

15. The method of claim 14, further comprising determining the latitude, longitude, and altitude of the first existing landmark based on the locations and the orientations of the one or more cameras at the times when the first and second images were captured in response to determining that the latitude, longitude, and altitude of the first existing landmark are not stored in the pre-existing database.

16. The method of claim claim 13, further comprising determining the locations and orientations of the one or more cameras at the times when the first and second images were captured based on data from a radar sensor, a lidar sensor, or an ultrasound sensor mounted on the one or more vehicles.

17. The method of claim claim 13,
wherein identifying the first existing landmark in the first image comprises identifying the first existing landmark in the first image without using a manually placed spatial marker, and
wherein identifying the first existing landmark in the second image comprises identifying the first existing landmark in the second image without using a manually placed spatial marker.

18. A system for creating a ground control point (GCP) file based on images captured by one or more cameras mounted on one or more vehicles, the system comprising:
a memory configured to:
store a first image and a second image with a threshold amount of overlap captured by the one or more cameras; and
store a first location and a first orientation of the one or more cameras at a time when the first image was captured;
store a second location and a second orientation of the one or more cameras at a time when the second image was captured;
processing circuitry configured to:
identify a first existing landmark in the first image based on a first existing landmark shown in the first image;
identify the first existing landmark in the second image based on the first existing landmark shown in the second image; and
determine that the first existing landmark matches the first and second location and the first and second orientation in the pre-existing database; and
create the GCP file including a latitude, a longitude, and an altitude associated with the entry in the pre-existing database and pixel coordinates of the first existing landmark in the first and second images.

19. The system of claim 18,
wherein the processing circuitry is further configured to receive user input selecting the first existing landmark from the pre-existing database of existing landmarks, and
wherein the processing circuitry is configured to identify the first existing landmark by scanning the first image for a template of the first existing landmark.

20. The system of claim 18,
wherein the processing circuitry is configured to identify the first existing landmark in the first image by identifying the first existing landmark in the first image without using a manually placed spatial marker, and
wherein the processing circuitry is configured to identify the first existing landmark in the second image by identifying the first existing landmark in the second image without using a manually placed spatial marker.

* * * * *